United States Patent
Ishikawa et al.

(10) Patent No.: US 6,240,353 B1
(45) Date of Patent: May 29, 2001

(54) INDUSTRIAL VEHICLE

(75) Inventors: Kazuo Ishikawa; Masaya Hyodo, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 08/828,180

(22) Filed: Mar. 18, 1997

(30) Foreign Application Priority Data

| Mar. 19, 1996 | (JP) | 8-063584 |
|---|---|---|
| Mar. 19, 1996 | (JP) | 8-063587 |
| Mar. 19, 1996 | (JP) | 8-063588 |
| Mar. 28, 1996 | (JP) | 8-074806 |
| Apr. 19, 1996 | (JP) | 8-098772 |
| Jun. 11, 1996 | (JP) | 8-149559 |
| Jun. 11, 1996 | (JP) | 8-149560 |
| Jun. 11, 1996 | (JP) | 8-149581 |
| Jun. 11, 1996 | (JP) | 8-149582 |

(51) Int. Cl.[7] ............... G06F 19/00; B66F 9/06
(52) U.S. Cl. ............ 701/50; 187/226; 60/426; 60/428; 91/420; 91/435; 91/388; 91/448; 91/403
(58) Field of Search ............ 701/50; 187/226; 60/426, 428; 91/420, 435, 388, 448, 403

(56) References Cited

U.S. PATENT DOCUMENTS

| 3,938,823 | | 2/1976 | Hiruma ............... 280/6.158 |
|---|---|---|---|
| 4,393,959 | * | 7/1983 | Acker ............... 187/9 E |
| 4,511,974 | * | 4/1985 | Nakane et al. ............... 364/463 |
| 5,087,068 | * | 2/1992 | Fukanaga et al. ............... 280/707 |
| 5,535,663 | * | 7/1996 | Yamashita et al. ............... 91/517 |
| 5,673,558 | * | 10/1997 | Sugiyama et al. ............... 60/426 |
| 5,791,372 | * | 8/1998 | Mukumoto ............... 137/462 |
| 5,832,807 | * | 11/1998 | Rausch et al. ............... 91/420 |
| 5,921,279 | * | 7/1999 | Barber ............... 137/596.16 |
| 5,942,839 | * | 8/1999 | Ohnishi et al. ............... 310/359 |
| 5,947,441 | * | 9/1999 | Zenker et al. ............... 251/44 |

FOREIGN PATENT DOCUMENTS

| 40 19732 A1 | 1/1991 | (DE) . | |
|---|---|---|---|
| 0 415 423 A1 | 3/1991 | (EP) . | |
| 49-77619 | 7/1974 | (JP) . | |
| 57-109007 | 7/1982 | (JP) . | |
| 58-167214 | 10/1983 | (JP) | B60G/25/00 |
| 58-167215 | 10/1983 | (JP) . | |
| 58-167400 | 10/1983 | (JP) | B66F/9/24 |
| 58-211903 | 12/1983 | (JP) . | |
| 58-214406 | 12/1983 | (JP) . | |
| 62-39386 | 2/1987 | (JP) | B62K/25/04 |
| 5-193322 | 8/1993 | (JP) | B06G/17/015 |
| 6-247118 | 9/1994 | (JP) | B06G/17/015 |
| 7-032848 | 2/1995 | (JP) | B06G/17/04 |

* cited by examiner

*Primary Examiner*—William A. Cuchlinski, Jr.
*Assistant Examiner*—Ronnie Mancho
(74) *Attorney, Agent, or Firm*—Morgan & Finnegan, L.L.P.

(57) ABSTRACT

A control apparatus for an industrial vehicle is disclosed. The vehicle has a rear axle that is swingable during straight travel of the vehicle and can be fixed during turning of the vehicle. A damper locks or unlocks the rear axle. A controller has a memory that stores a first value and a second value of an angular velocity rate that represents an angular velocity per unit time. The controller activates or deactivates the damper. The controller activates the damper to lock the rear axle when the angular velocity rate is greater than the first value. The controller deactivates the damper to unlock the rear axle when the angular velocity rate is kept smaller than the second value for a predetermined time period after the angular velocity rate has become smaller than the second value.

29 Claims, 13 Drawing Sheets

INDUSTRIAL VEHICLE

BACKGORUND OF THE INVENTION

1. Field of the Invention

The present invention relates to axle supporting apparatus for industrial vehicles, and more particularly, to an apparatus for locking swingable axles of industrial vehicles.

2. Description of the Related Art

A typical forklift truck has a rear axle that is supported by a body frame. The rear axle is swung with respect to the body frame by lateral acceleration, or centrifugal force, that is produced when the traveling forklift truck changes directions. This degrades the traveling stability of the forklift truck. Thus, the traveling speed of the forklift truck must be decreased when changing directions.

Japanese Unexamined Patent Publication No. 58-211903 describes a forklift truck that locks the swinging of an axle when the truck turns. The forklift truck has a detecting means that detects centrifugal force when the truck is turned. When the centrifugal force becomes greater than a predetermined level, the swinging of the axle with respect to the body frame is restricted. In other words, the axle is locked. This enables stable turning of the forklift truck without having a slow down the vehicle. However, when the forklift truck successively changes direction within a short period of time, for example, when the vehicle turns right and then turns left immediately afterward, the centrifugal force, for an instant, is less than the predetermined level. This releases the locking of the axle regardless of the vehicle changing directions. As a result, the forklift truck becomes unstable when successively turned in different directions.

Japanese Unexamined patent Publication No. 58-214406 described a forklift truck that locks its axle when the rotated angle of the steering wheel and the speed of the vehicle become greater than predetermined values. However, when the vehicle is successively turned in different directions, for an instant, the rotated angle of the steering wheel becomes smaller than the predetermined angle. Thus, in the same manner as the forklift truck of Publication No. 58-211903, this releases the locking of the axle and causes instability.

Among the four wheels (two front wheels and two rear wheels) of a forklift truck, one of the wheels may be lifted from the ground depending on the weight of the object held by the forks when the axles are locked during turning. For example, when a heavy object is held on the forks, the center of gravity of the vehicle is displaced toward the front of the forklift truck. This may lift one of the rear wheels from the ground if one of the axles are locked. If the axles are locked when a relatively light object is held on the forks, the balance weight provided at the rear of the vehicle may cause one of the front wheels to raise from the ground.

Typically, torque is transmitted to the front wheels to drive forklift trucks. The steering angle is transmitted to the rear wheels to steer the vehicle. Accordingly, if the rear axle is locked when a relatively light object is held on the forks, one of the front wheels, which function as the drive wheels, may be lifted away from the ground. This decreases traction between the front wheels and the ground. As a result, the driving force of the vehicle becomes insufficient. This hinders smooth operation of the forklift truck.

If a heavy object is held on the forks, the center of gravity, which is near the front of the vehicle, increases the traction force of the front wheels. Accordingly, the locking of the axle does not affect the driving force of the vehicle. However, when the center of gravity is near the front of the vehicle, the vehicle tends to swing in a forward direction. As a result, the forklift truck becomes unstable when lifting and lowering objects and when traveling with the heavy object held on the forks. This tendency is stronger is the object is held at a high position, which raises the center of gravity.

SUMMARY OF THE INVENTION

Accordingly, it is an objective of the present invention to provide an industrial vehicle that is capable of traveling in a stable manner.

A further objective of the present invention is to provide an industrial vehicle that is capable of lifting and lowering objects in a stable manner.

For achieving the above objectives, an improved control apparatus for an industrial vehicle is provided. The vehicle includes a rear axle, said rear axle being swingable during straight travel of the vehicle and lockable during turning of the vehicle. The apparatus comprises holding means for selectively locking and unlocking the rear axle, memory means for storing a first value and a second value of an angular velocity rate, wherein said angular velocity rate represents an angular velocity per unit time, wherein said first value is predetermined to indicate turning of the vehicle when the angular velocity rate is greater than the first value, and wherein said second value is predetermined to indicate the straight travel of the vehicle when the angular velocity rate is smaller than the second value, and control means for selectively activating and deactivating the holding means. The control means activates the holding means to lock the rear axle when the angular velocity rate is greater than the first value, and said control means deactivates the holding means to unlock the rear axle when the angular velocity rate is kept smaller than the second value for a predetermined time period after the angular velocity rate has become smaller than the second value.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
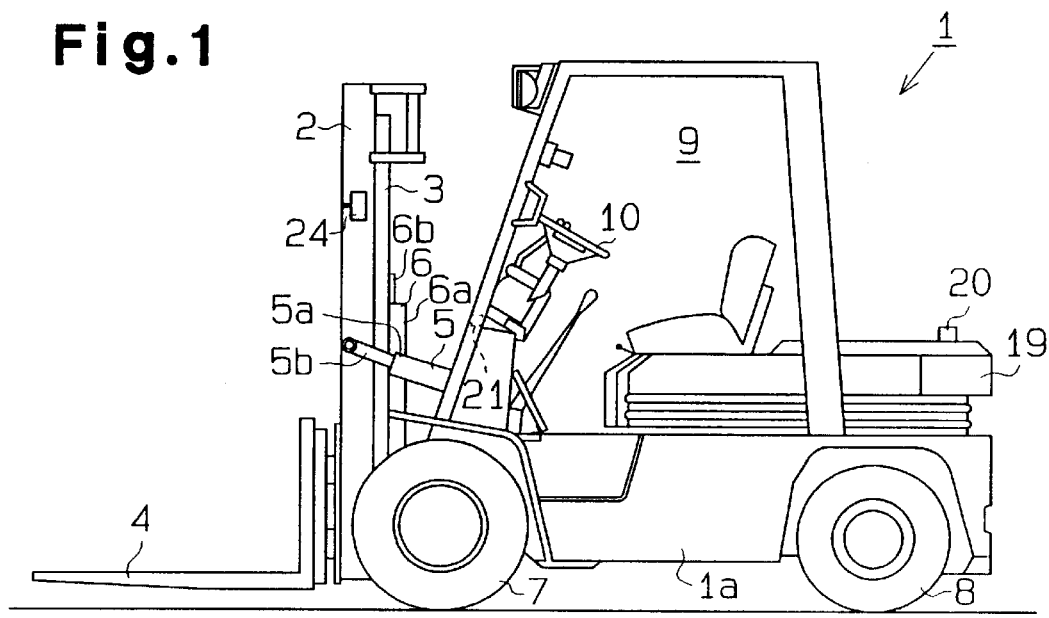
FIG. 1 is a side view showing a forklift truck that is provided with a controller according to the present invention.

An industrial vehicle, or forklift truck 1 having a body frame 1a is shown in FIG. 1. A pair of left and right outer masts 2 are mounted on the front of the forklift truck 1. A pair of inner masts 3 are provided between the outer masts 2. A fork 4 is mounted on each inner mast 3. The fork 4 is lifted and lowered by the associated inner mast 3. A tilting cylinder 5 having a body 5a and a cylinder rod 5b is provided for each outer mast 2. The body 5a is coupled to the body frame 1a while the cylinder rod 5b is coupled to the associated outer mast 2. The outer masts 2 and the forks 4 are tilted by the tilting cylinders 5. A lifting cylinder 6 having a body 6a and a rod 6b is provided for each inner mast 3. The body 6a is coupled to the body frame 1a while the cylinder rod 6b is coupled to the associated inner mast 3. The inner masts 3 are lifted and lowered by the lifting cylinders 6, on which the forks 4 are mounted.

Figure 4:
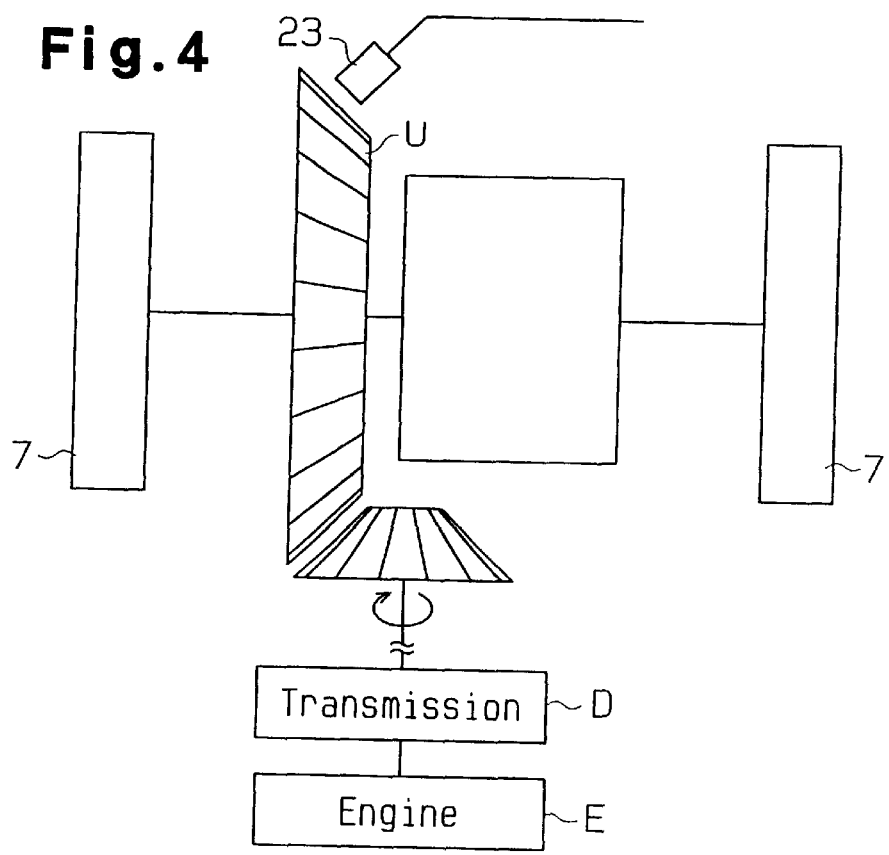
FIG. 4 is a diagrammatic drawing showing the front wheels the driving mechanism of the front wheels, and sensors.

A pair of front wheels 7 are mounted at the front portion of the frame 1a. As shown in FIG. 4, the front wheels 7 are connected to an engine E by means of a differential gear U and a transmission D. Hence, each front wheel 7 is driven by the engine E.

Figure 2:
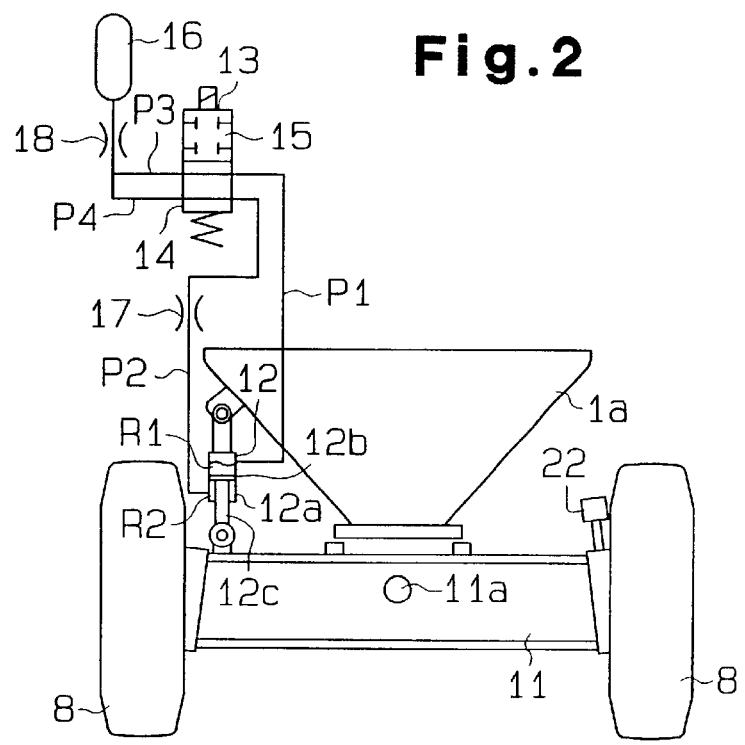
FIG. 2 is a schematic, partial rear view showing the forklift truck together with the rear axle, the shock absorber, and the hydraulic circuit.

A pair of rear wheels 8 are mounted at the rear portion of the frame 1. A structure for connecting the rear wheels 8 is shown in FIG. 2. A rear axle 11 is provided at the lower rear portion of the frame 1a extending between the left and right sides of the frame 1a. The rear axle 11 is pivotal about a center pin 11a. The rear wheels 8 are mounted on the ends of the rear axle 11. The direction of the rear wheels 8 is changed by turning a steering wheel 10, which is installed in a driver's compartment 9.

A damper, or shock absorber 12 is connected between the body frame 1a and the rear axle 11. The shock absorber 12 is a double action hydraulic cylinder and absorbs the force that is applied to the rear wheels 8. The shock absorber 12 includes a cylindrical body 12a, a piston 12b accommodated in the body 12a, and a piston rod 12c connected to the piston 12b. The distal end of the piston rod 12c is connected to the rear axle 11.

a first compartment R1 and a second compartment R2 are defined in the shock absorber 12 by the piston 12b. A first oil passage P1 is connected to the first chamber R1 while a second oil passage P2 is connected to the second chamber R2. The first and second oil passages P1, P2 are connected to an electromagnetic switching valve 13. The switching valve 13 includes a body and a spool. The spool has a connecting portion 14 and a disconnecting portion 15. A third oil passage P3 and a fourth oil passage P4 are connected to the switching valve 13. The third oil passage P3 is connected with the fourth oil passage P4. The fourth oil passage P4 is connected to an accumulator 16 in which hydraulic oil is reserved. A throttle valve 17 is provided in the second oil passage P2.

In the switching valve 13, the spool moves with respect to the body and selectively connects the connecting portion 14 and the disconnecting portion 15 with the oil passages P1 to P4. When the connecting portion 14 is connected to the oil passages P1 to P4, the first oil passage P1 is communicated with the third oil passage P3 and the second oil passage P2 is communicated with the fourth oil passage P4. In this state, the first and second chambers R1, a R2 are communicated with the accumulator 16. This permits hydraulic oil to flow in and out of the first and second chambers R1, R2. Thus, the shock absorber 12 enables pivoting of the rear axle 11. When the disconnecting portion 15 is connected with the oil passages P1 to P4, the oil passages P1 to P4 are disconnected from one another. In this state, the piston 12b of the shock absorber 12 is locked. Thus, the hock absorber 12 prohibits pivoting of the rear axle 11.

Figure 3:
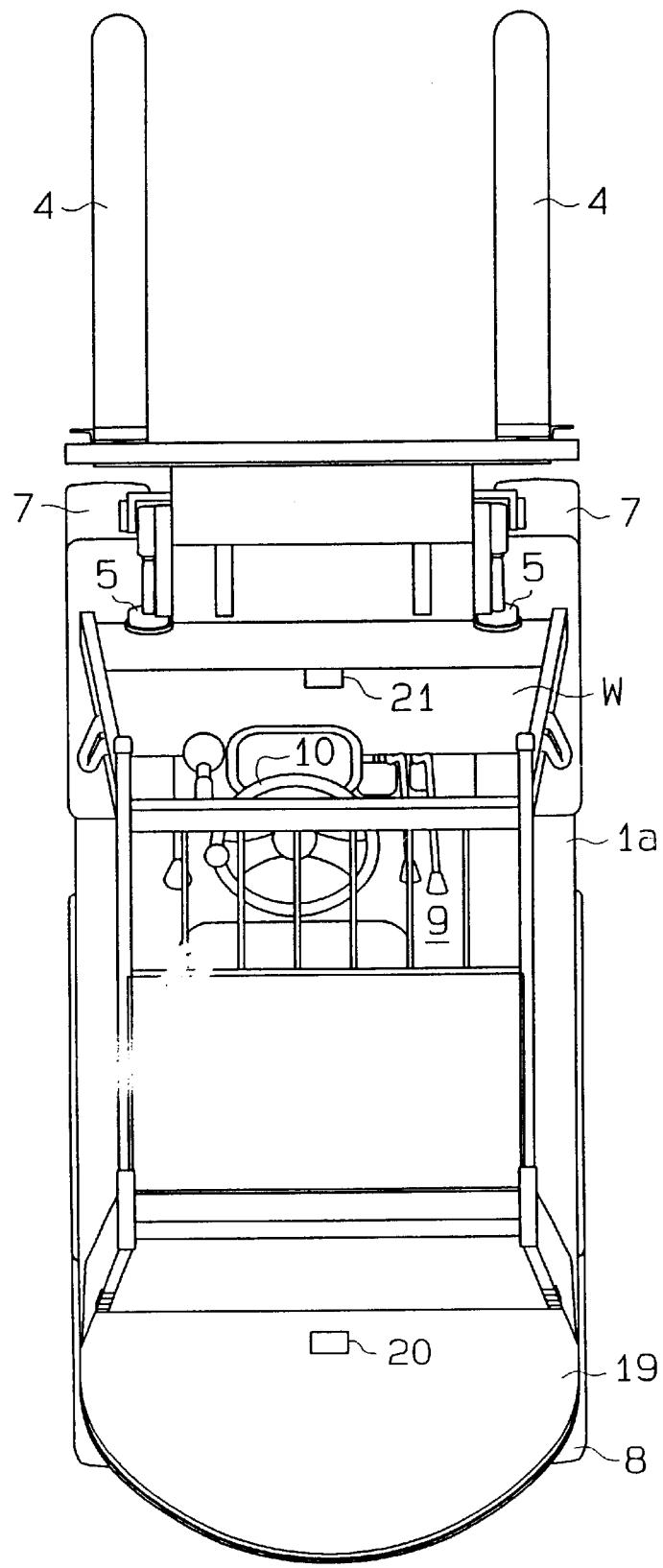
FIG. 3 is a plan view showing the forklift truck.

As shown in FIG. 1, a balance weight 19 is mounted on the rear of the forklift truck 1. A piezo-electric sensor, or gyroscope 20, is arranged on the balance weight 19. The gyroscope 20 detects the angular velocity, or yaw rate ω of the forklift truck 1 when changing directions. As shown in FIGS. 1 and 3, an acceleration sensor 21 is arranged on an instrument panel W provided in the driver's compartment 9. The acceleration sensor 21 is located midway between the front wheels 7. Actual lateral acceleration, or actual centrifugal force Fa, that is produced when the forklift truck 1 changes directions is detected by the acceleration sensor 21.

Figure 5:
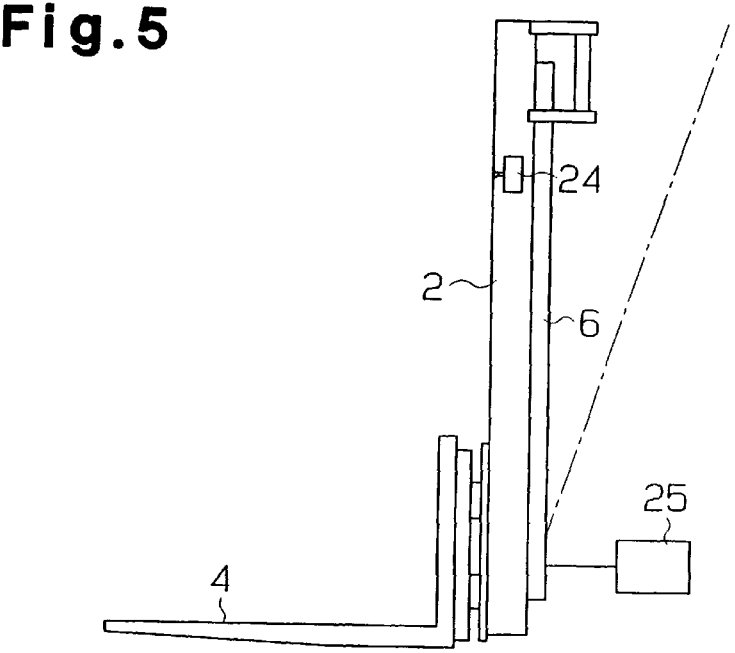
FIG. 5 is a diagrammatic drawing showing the forks that are mounted on the outer masts at the front of the forklift truck together with sensors.

As shown in FIGS. 1 and 5, a limit switch 24 is arranged at the upper portion of the outer mast 2 to detect the vertical position of the associated fork 4. The limit switch 24 is located at a position that is lower than the top end of the outer mast 2 by one fourth the length of the mast 2. A pressure sensor 25 is provided at the bottom end of the lifting cylinder 6 to detect the hydraulic pressure of the hydraulic oil that acts on the lifting cylinder 6.

As shown in FIG. 2, a steering angle sensor 22 is arranged on one of the rear wheels 8 to the detect the steering angel θ of the rear wheels 8. As shown in FIG. 4, a vehicle speed sensor 23 is provided in the forklift truck 1 to detect the rotating speed of the differential gear U, or the traveling speed v of the forklift truck 1.

Figure 7:
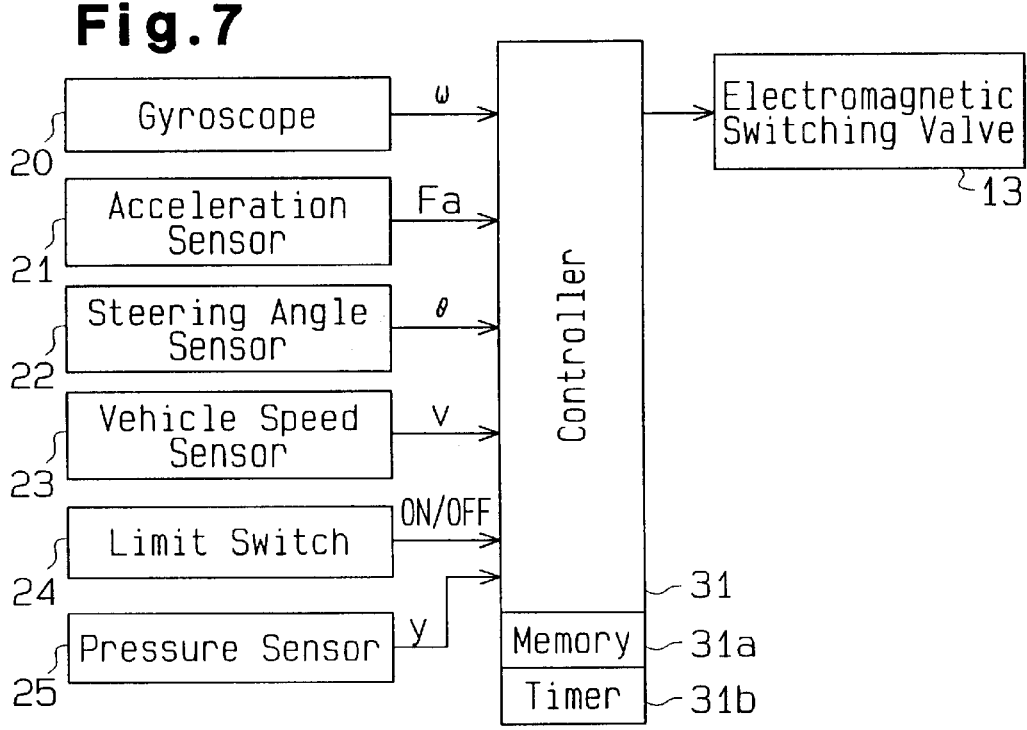
FIG. 7 is a block diagram showing the electrical structure of the forklift truck.

The electrical structure of a controller 31 employed in the above industrial vehicle will now be described with reference to an electric block diagram illustrated in FIG. 7.

The controller 31 has a memory 31a and a timer 31b that are included in a central processing unit (CPU), a read only memory (ROM), and other parts. The controller 31 also has an input terminal and an output terminal. The gyroscope 20, the acceleration sensor 21, the steering angle sensor 22, the vehicle speed sensor 23, the limit switch 24, and the pressure sensor 25 are connected to the input terminal. The electromagnetic switching valve 13 is connected to the output terminal of the controller 31.

When the forklift truck 1 changes direction, the gyroscope 20 sends an angular velocity signal, which corresponds to the detected yaw rate $\omega$, to the controller 31. When the forklift truck 1 changes direction, the acceleration sensor 21 sends an actual centrifugal force signal, which corresponds to the detected actual centrifugal force Fa, to the controller 31. The steering angle sensor 22 sends a steering angle signal, which corresponds to the detected steering angle $\theta$ of the rear wheels 8, to the controller 31. The vehicle speed sensor 23 sends a speed signal, which corresponds to the detected speed v of the forklift truck 1, to the controller 31.

The limit switch 24 sends an activated signal to the controller 31 when actuated as the associated for 4 is lifted above a reference height Zref. The reference height Zref is located at a position that is lower than the top end of the outer mast 2 by approximately one fourth the length of the outer mast 2. The pressure sensor 25 sends a hydraulic pressure signal, which corresponds to the detected hydraulic pressure y applied to the lifting cylinder 6, to the controller 31.

Based on the angular velocity signal sent from the gyroscope 20, the controller 31 computes the angular velocity altering rate, or the yaw rate altering rate $\Delta\omega/\Delta T$. The altering rate $\Delta\omega/\Delta T$ corresponds to the angular acceleration. The controller 31 obtains the altering rate $\Delta\omega/\Delta T$ by differentiating the yaw rate $\omega$ with respect to time.

The controller 31 determines lateral acceleration based on centrifugal force. The controller 31 computes centrifugal force based on the traveling speed signal from the vehicle speed sensor 23 and the angular velocity signal from the hyroscope 20. The computed centrifugal force Fb differs from the actual centrifugal force detected by the acceleration sensor 21. Thus, there is a slight difference between the value of the actual centrifugal force Fa and the computed centrifugal force Fb. The computed centrifugal force Fb is obtained by multiplying the traveling speed v by the annular velocity $\omega$, as represented by the following equation (1):

$$Fb = v \times \omega \qquad (1)$$

Reference values of the yaw rate altering rate $\Delta\omega/\Delta T$ are stored in the memory 31a of the controller 31. The reference rate values include a maximum reference value Kmax, which is referred to when the rate $\Delta\omega/\Delta T$ increases, and a minimum reference value Kmin, which is referred to when the rate $\Delta\omega/\Delta T$ decreases. The controller 31 starts the output of a locking signal when the value of the computed altering rate $\Delta\omega/\Delta T$ changes from a value equal to or smaller than the maximum reference value Kmax to a valve greater than the maximum reference value Kmax. When the locking signal is being output, the controller 31 compares the altering rate $\Delta\omega/\Delta T$ with the minimum reference value Kmin. If the value of the altering rate $\Delta\omega/\Delta T$ changes from a valve equal to or greater than the minimum reference value Kmin to a valve smaller than the minimum reference value Kmin, the controller 31 stops the output of the locking signal.

The controller 31 waits for a predetermined time length T to elapse before stopping the output of the locking signal. More specifically, a timer 31b starts measuring time when the value of the altering rate $\Delta\omega/\Delta T$ changes from a value equal to or greater than the minimum reference valve Kmin to a valve smaller than the minimum reference value Kmin. When the measure dtime reaches the time length T, the controller 31 stops the output of the locking signal. The time 31b is controlled by the controller 31 so as to stop measuring time when the value of the altering rate $\Delta\omega/\Delta T$ becomes equal to or greater than the minimum reference valve Kmin.

Reference values of the centrifugal force acting on the forklift truck 1 are stored in the memory 31a of the controller 31. The reference valves include a centrifugal force maximum reference valve Hmax, which is referred to when the centrifugal force increases, and a centrifugal force minimum reference value Hmin, which is referred to when the centrifugal force decreases. The controller 31 starts outputting a locking signal when the absolute value of the computed centrifugal force Fb changes from a value equal to or smaller than the maximum reference valve Hmax to a valve greater than the maximum reference value Hmax. During the output of the locking signal, the controller 31 stops the looking signal if the absolute value of the computed centrifugal force Fb becomes smaller than the minimum reference value Hmin.

The controller 31 determines the weight of the load on the forks 4 based on the signal from the pressure sensor 25. The controller 31 further computes and locates the center of gravity G (FIG. 6) of the forklift truck 1 based on the weight of the load. The center of gravity G corresponds to the center of gravity of the combined mass of the vehicle and the load. In this case, the controller computes the center of gravity G under the assumption that the inclination of the outer masts 2 is maximum as shown in the dotted lines of FIG. 5. A reference pressure value Nref of the hydraulic pressure y applied to the lifting cylinder 6 is stored in the memory 31a of the controller 31.

The controller 31 computes the hydraulic pressure y applied to the lifting cylinder 6 based on the detecting signal from the pressure sensor 25 when receiving an activated signal from the limit switch 24. If the hydraulic pressure y is equal to or greater than the reference pressure value Nref, the controller 31 sends alocking signal to the electromagnetic switching valve 13.

More specifically, the controller 31 sends a locking signal to the switching valve 13 when any one of the following six conditions is satisfied:

(a) The yaw rate altering rate $\Delta\omega/\Delta T$ is grater than the maximum reference value Kmax.

(b) the yaw rate altering rate $\Delta\omega/\Delta T$ becomes less than the maximum reference value Kmax from a valve greater than the maximum reference value Kmax but is grater than the minimum reference valve Kmin.

(c) The yaw rate altering rate $\Delta\omega/\Delta T$ is less than the minimum reference value Kmin within the predetermined time length T, which is measured from when the altering rate $\Delta\omega/\Delta T$ falls below the minimum reference valve Kmin from the state where condition (b) is satisfied.

(d) The absolute valve of the computed centrifugal force Fb is grater than the maximum reference valve Hmax.

(e) The absolute value of the computed centrifugal force Fb becomes equal to or less than the maximum reference valve Hmax form a valve greater than the maximum reference valve Hmax but is greater than the minimum reference value Hmin.

(f) The activated signal is sent from the limit switch 24 and the hydraulic pressure y applied to the lifting cylinder 6 is equal to or greater than the reference pressure value N.

The electromagnetic switching valve 13 has a solenoid that is excited by the locking signal. This causes the disconnecting portion 15 of the switching valve 13 to be selectively connected with the oil passages P1 to P4. As a result, the switching valve 13 closes the first and second oil passages P1, P2 and locks the rear axle 11 with the shock absorber 12. When not receiving the locking signal, the solenoid is de-excited. This causes the connecting portion 14 to be selectively connected to the oil passages P1 to P4. As a result, the switching valve 13 permits hydraulic oil to flow in and out of the first and second chamber R1, R2. In such state, the body frame 1a is swingable with respect to the rear axle 11.

Figure 8A:
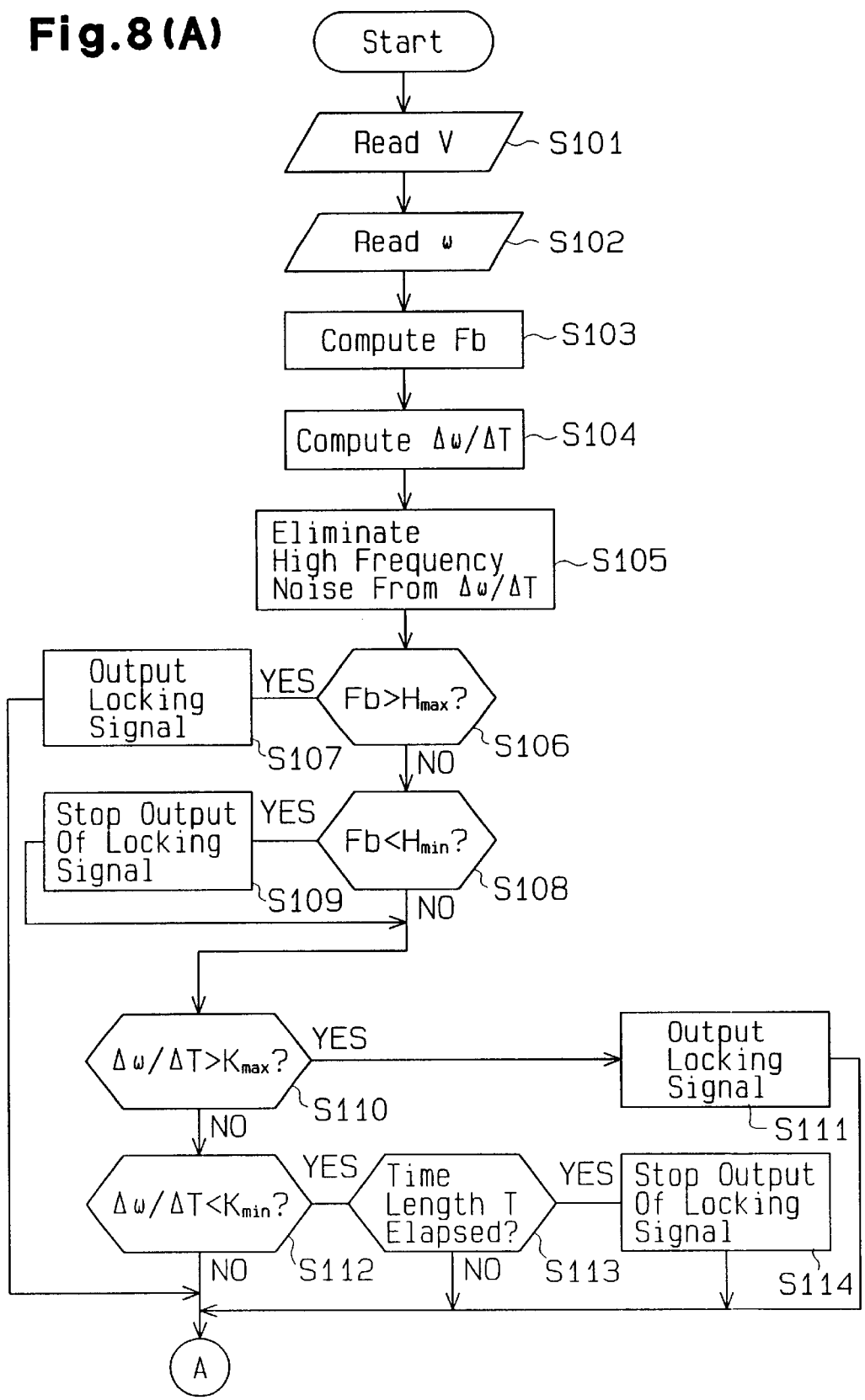
FIGS. 8(A) and 8(B) are flowcharts showing the operation of the controller.
Figure 8B:
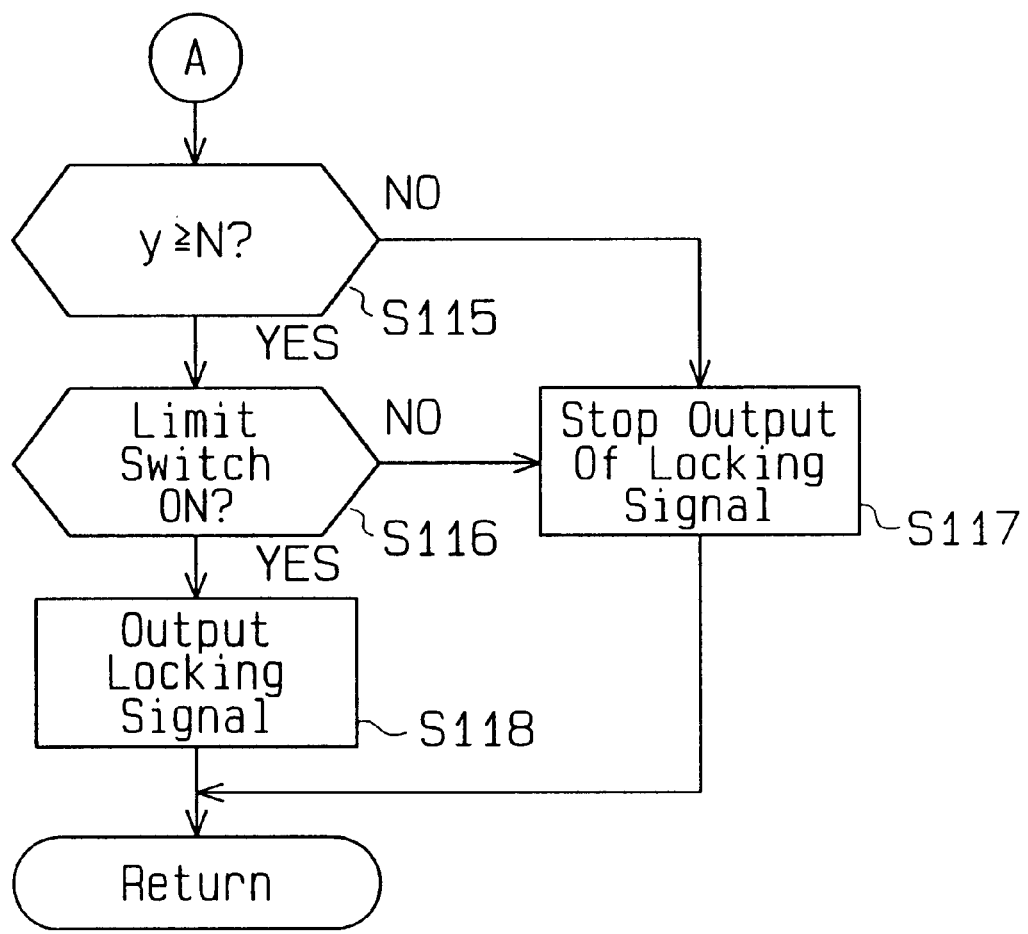
Figure 9:
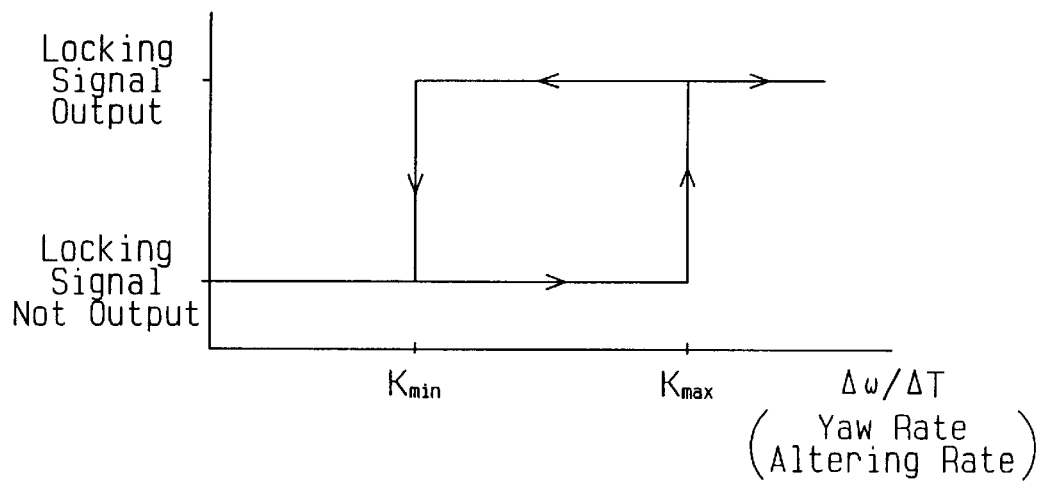
FIG. 9 is a graph showing the timing of the output of the locking signal in relation to changes in the yaw rate altering rate.

The controller 31 locks the rear axle 11 with the switching valve 13 in accordance with the flowchart illustrated in FIGS. 8(A) and 8(B). It is presumed here that the locking signal is not being output from the controller 31 and that the rear axle 11 is swingable when the controller 31 enters the control processing of FIG. 8(A).

In the flowcharts, the characters "S" stands for "steps." At step 101, the controller 31 reads the traveling speed v of the forklift truck 1 based on the traveling speed signal sent from the vehicle speed sensor 23. At step 102, the controller 31 reads the yaw rate ω based on the angular velocity signal sent from the gyroscope 20. At step 103, the controller 31 obtains the computed centrifugal force Fb by applying the traveling speed v and the yaw rate ω to the equation (1).

At step 104, the controller 31 computes the yaw rate altering rate $\Delta\omega/\Delta T$ based on the yaw rate ω. The controller 31 has a low pass filter function, which is used in step 105 to eliminate high frequency noise from the altering rate $\Delta\omega/\Delta T$.

At step 106, the controller 31 determines whether the absolute value of the computed centrifugal force Fb (|Fb|) is greater than the maximum reference valve Hmax. If it is determined that the altering rate $\Delta\omega/\Delta T$ is greater than the maximum reference valve Hmax, the controller 31 proceeds to step 107 and continuously outputs a locking signal to the electromagnetic switching valve 13 and maintains the solenoid thereof in an excited state. This employees the disconnecting portion 15 of the switching valve 13 and causes the shock absorber 12 to hold the rear axle 11 in a locked state. Thus, the rear axle 11 is held in a manner such that swinging is restricted. The controller 31 then returns to step 101 and repeats the execution of the above steps.

When it is determined that the absolute value |Fb| is equal to or smaller than the maximum reference value Hmax, the controller 31 proceeds to step 108. At step 108, the controller 31 determines whether the absolute value |Fb| is smaller than the minimum reference value Hmin. If, in step 108, it is determined that the absolute value |Fb| is smaller than the minimum reference value Hmin, the controller 31 proceeds to step 109 and stops the output of the locking signal. The controller 31 than proceeds to step 110. If, in step 108, it is determined that the absolute valve |Fb| is equal to or greater than the minimum reference value Hmin, the controller 31 proceeds to step 110 without outputting the locking signal.

At step 110, the controller 31 determines whether the yaw rate altering rate $\Delta\omega/\Delta T$ is greater than the maximum reference value Kmax. When it is determined that the altering rate $\Delta\omega/\Delta T$ is greater than the maximum reference value Kmax, the controller 31 proceeds to step 111 and outputs the locking signal to the switching valve 13. This fixes the shock absorber 12 and holds the rear axle 11 in a locked state. The controller 31 then returns to step 101 and repeats the execution of the above steps. If it is determined that the altering rate $\Delta\omega/\Delta T$ is equal to or less than the maximum reference value Kmax in step 110, the controller 31 processes to step 112.

At step 112, the controller determines whether the altering rate $\Delta\omega/\Delta T$ is smaller than the minimum reference value Kmin. When it is determined that the altering rate $\Delta\omega/\Delta T$ is smaller than the minimum reference valve Kmin, the controller 31 proceeds to step 113 and determines whether the time measured by the timer 31b has reached the predetermined time length T. When it is determined that the time length T has not yet elapsed, the controller 31 returns to step 101 and repeats the above steps. If it is determined that the time length T has elapsed, the controller 31 proceeds to step 114 and stops the output of the locking signal. Afterwards, the controller 31 returns to step 101.

The controller 31 then proceeds to step 112 and determines whether the value of the hydraulic pressure y, which is obtained based on the signal from the pressure sensor 25, is equal to or greater than the reference pressure value Nref. When it is determined that the hydraulic pressure y is equal to or greater than the reference value Nref, the controller 31 proceeds to step 116 and determines whether the activated signal is being output from the limit switch 24. If it is determined that the activated signal is being output from the limit switch 24, the controller 31 proceeds to step 118 and continues to output the locking signal.

If it is determined that the value of the hydraulic pressure y is smaller than the reference value Nref in step 115, the controller 31 proceeds to step 117 and stops outputting the locking signal. The controller 31 also proceeds to step 117 and stops outputting the locking signal if it is determined that the activated signal is not being output from the limit switch 24 in step 116.

Figure 11:
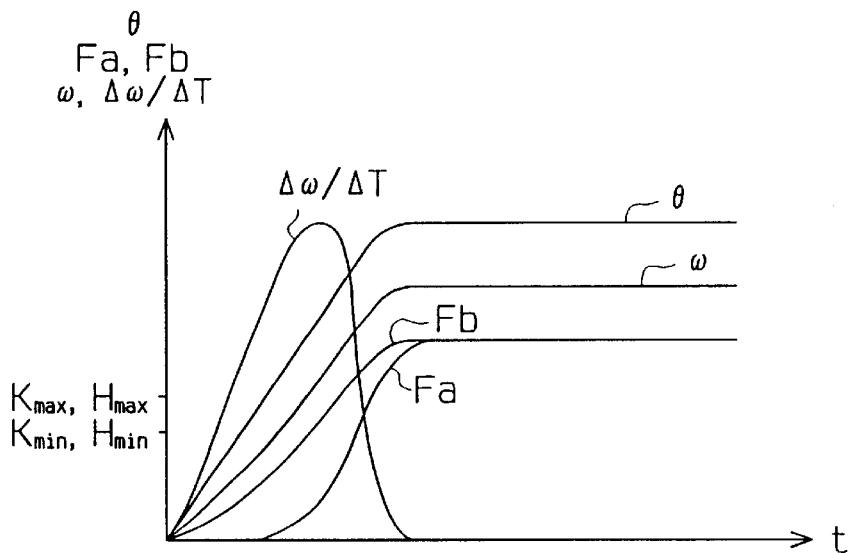
FIG. 11 is a graph showing changes of the yaw rate altering rate, the yaw rate, the steering angle, the actual centrifugal force, and the computed centrifugal force with respect to time when the forklift truck turns from a state in which it is traveling straight.

The processing performed by the controller 31 when the forklift truck 1 is turned to the right from a state in which it is traveling straight will now be described with reference to FIG. 11. When the forklift truck 1 turns right, the value of the steering angle θ becomes positive and when turning left, the value of the steering angle θ becomes negative. In the same manner, the value of the yaw rate ω, the actual centrifugal force Fa, and the computed centrifugal force Fb become negative when the forklift truck 1 turns left, and positive when the truck 1 turns right.

When the operator of the forklift truck 1 steers the steering wheel 10 and turns the forklift truck 10 to the right, the valve of the steering angle θ increases. As the value of the steering angle θ increases, the values of the yaw rate ω, the computed centrifugal force Fb, the actual centrifugal force Fa, and the yaw rate altering rate $\Delta\omega/\Delta T$ are each increased accordingly. The altering rate $\Delta\omega/\Delta T$ is the first to increase among these values and becomes greater than the maximum reference valve Kmax. The controller 31 locks the rear axle 11 when the altering rate $\Delta\omega/\Delta T$ becomes greater than the maximum reference valve Kmax. At this point, the valve of the computed centrifugal force Fb is smaller than the maximum reference valve Hmax. Accordingly, when the turning of the forklift truck 1 begins, the rear axle 11 is locked by the altering rate $\Delta\omega/\Delta T$ before being locked by the computed centrifugal force Fb.

As the value of the steering angle θ further increases, the valves of the yaw rate ω, the computed centrifugal force Fb, and the actual centrifugal force Fa are each increased accordingly. This causes the absolute valve of the computed centrifugal force |Fb| to become greater than the maximum reference valve Hmax. At this point, the altering rate $\Delta\omega/\Delta T$ is greater than the maximum reference valve Kmax and the rear axle 11 is held in a locked state.

When the operator continues to turn the forklift truck 1 by holding the steering wheel 10 at the same predetermined angle, resulting in continuation of the same steering angle θ, the yaw rate ω, the computed centrifugal force Fb, and the actual centrifugal force Fa and maintained at constant values. When the value of the steering angle θ becomes constant, the valve of the altering rate Δω/ΔT starts decreasing and becomes smaller than the minimum reference value Kmin. At this point, the computed centrifugal force Fb is greater than the maximum reference value Hmax. Thus, the controller 31 outputs the locking signal since the computed centrifugal force Fb is greater than the maximum reference valve Hmax. Accordingly, the rear axle 11 remains in a locked state.

The above processing is executed in the same manner when the forklift truck 1 is steered to the left from a state in which it is traveling straight. Thus, when the forklift truck 1 is driven in a straight direction and then steered either to the right or tho the left, the altering rate Δω/ΔT first becomes greater than the maximum reference value Kmax and locks the rear axle 11. The altering rate Δω/ΔT then becomes smaller than the minimum reference valve Kmin. However, since the absolute value of the centrifugal force |Fb| is greater than the maximum reference valve Hmax, the rear axle 11 remains in a locked state.

The processing performed by the controller 31 when the forklift truck 1 is steered to the right and then successively steered to the left will now be described with reference to FIG. 12. When the forklift truck 1 is steered to the right in a manner such that the value of the steering angle θ is constant and is then steered to the left by turning the steering wheel 10 so as to decreases the valve of the steering angle θ, the yaw rate ω and the computed centrifugal force Fb start to decrease from the predetermined valves. When the computed centrifugal force Fb corresponds to the predetermined value, the centrifugal force Fb exceeds the maximum reference valve Hmax. Thus, the controller 31 outputs the locking signal and locks the rear axle 11. The value of the altering rate Δω/ΔT starts to increase as the steering angle θ decreases and becomes greater than the maximum reference value Kmax. At this point, the computed centrifugal force Fb is greater than the minimum reference value Hmin.

A further decrease of the steering angle θ causes the computed centrifugal force Fb to become smaller than the minimum reference value Kmin. However, the controller 31 continues to output the locking signal since the altering rate Δω/ΔT is greater than the maximum reference valve Kmax.

The altering rate Δω/ΔT is maximum when the steering angle θ becomes close to zero degrees. The forklift truck 1 begins to turn left as the valve of the steering angle θ reaches zero degrees and then further decreases. The decrease in the value of the steering angle θ causes further decrease of the valves of the yaw rate ω and the computed centrifugal force Fb. The values of the yaw rate ω and the computed centrifugal force Fb become negative and continues to further decrease. This increases the absolute values of the yaw rate ω and the computed centrifugal force Fb (|Fb|, |ω|). Thus, the absolute value of the computed centrifugal force |Fb| becomes greater than the maximum reference value Hmax. At this point, the altering rate Δω/ΔT is equal to or greater than the minimum reference value Kmin. Since the conditions of |Fb|>Hmax and Δω/ΔT>Kmin are satisfied, the controller 31 continues to output the locking signal. Thus, the rear axle 11 remains locked.

A further decrease of the steering angle θ causes the altering rate Δω/ΔT to become smaller than the minimum reference value Kmin. However, the controller 31 continues to output the locking signal and keeps the rear axle 11 in a locked state. The locking signal is continued prior to the expiration of the predetermine dtime length T, which is measured from when the altering rate Δω/ΔT became smaller than the minimum reference value Kmin. Also, the locking signal is continues as long as the absolute value of the computed centrifugal force |Fb| is greater than the maximum reference value Hmax. When the operator stops turning the steering wheel 10 and holds the steering angle θ at a predetermined angle, the valves of the yaw rate ω and the computed centrifugal force Fb become constant. Furthermore, the valve of the altering rate Δω/ΔT becomes zero.

When the predetermined time length T elapses, the conditions related to the altering rate Δω/ΔT for outputting the locking signal fail to be met. However, the conditions related to the computed centrifugal force Fb remain satisfied. Accordingly, the controller 31 continues to output the locking signal and keeps the rear axle 11 in a locked state.

When the forklift truck 1 turns right and then left successively, there is a period Y1 during which the conditions for outputting the locking signal related to the computed centrifugal force Fb are unsatisfied when the steering angle θ is in the vicinity of zero degrees. However, the conditions for outputting the centrifugal force Fb related to the altering rate Δω/ΔT are satisfied. Thus, the rear axle 11 is constantly in a locked state when the forklift truck 1 turns right and then left successively. Holding the steering angle θ at a predetermined angle to steer the forklift truck 1 further to the left ends a period Y2, at which the conditions for outputting the locking signal related to the altering rate Δω/ΔT are satisfied. However, since the conditions for outputting the locking signal related to the computed centrifugal force Fb are satisfied, the rear axle 11 remains in a locked state. Accordingly, when the forklift truck 1 turns right and then left successively, the rear axle 11 remains in a locked state.

The above processing is carried out in the same manner when the forklift truck 1 turns left and then right successively.

Figure 12:
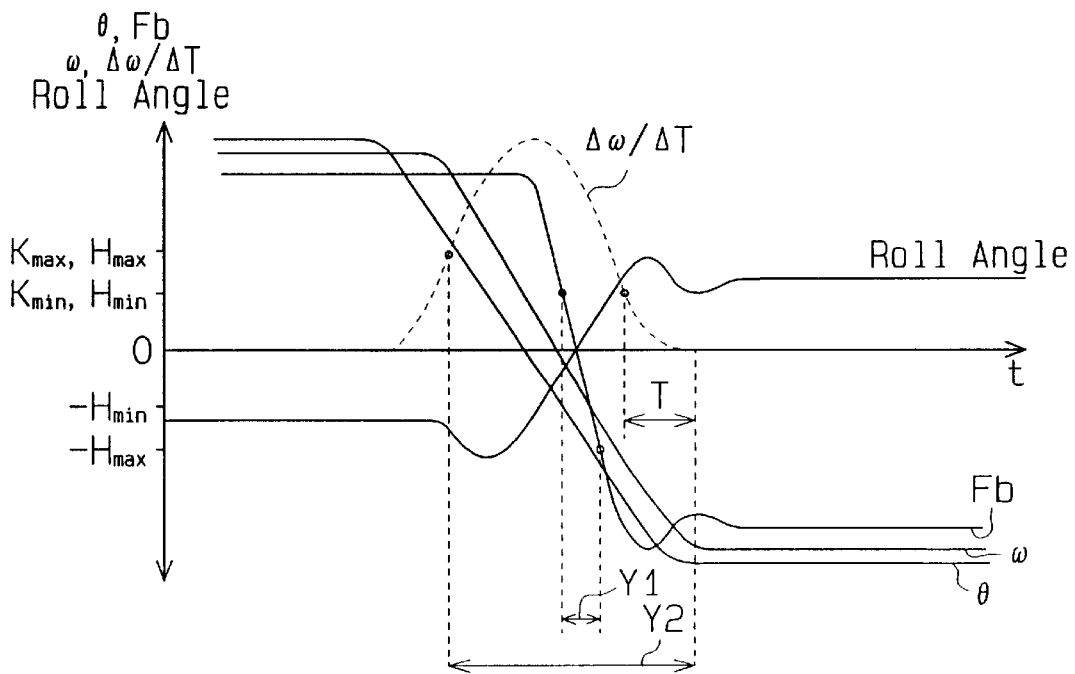
FIG. 12 is a graph showing changes of the yaw rate altering rate, the yaw rate, the steering angle, the actual centrifugal force, and the computed centrifugal force with respect to time when the forklift truck changes directions in a successive manner.

FIG. 12 shows the roll angle of the forklift truck 1 when in a rolling state. The roll angle is detected by a rolling sensor (not shown) provided on the body frame 1*a*.

As described above, in addition to the locking signal based on the altering rate Δω/ΔT, the controller 31 outputs a locking signal based on the computed centrifugal force Fb. Accordingly, during successive turning of the forklift truck 1, the locking signal based on the altering rate Δω/ΔT is output even when the locking signal based on the computed centrifugal force Fb is not output when the steering angle θ is close to zero degrees. Thus, when the forklift truck 1 turns right and then left successively, the rear axle 11 is constantly maintained in a locked state. This enables the forklift truck 1 to change directions in a stable manner.

The control performed by the controller 31 when the forklift truck 1 transports loads will now be described.

Figure 6:
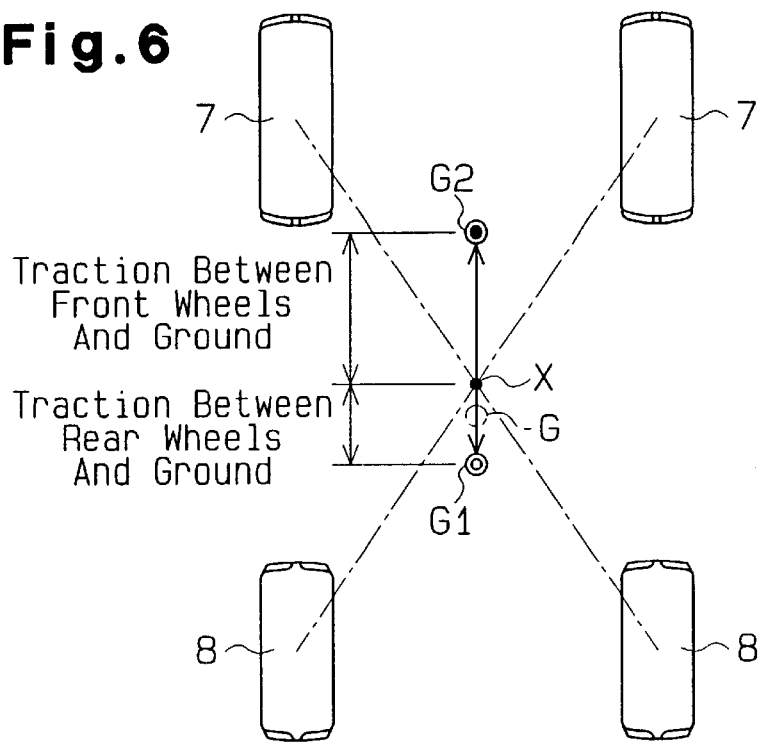
FIG. 6 is a diagrammatic drawing showing the relationship between the position of the center of gravity and the traction force of the front and rear wheels.

FIG. 6 is an explanatory diagram that shows how a center of gravity G of the forklift truck 1 changes in accordance with the weight of the load carried on the forks 4 of the forklift truck 1. Diagonal lines have been drawn between the left front wheel 7 and the left rear wheel 8. The center of gravity, when there is no load carried on the forks 4, is denoted as G1 and is located rearward with respect to the intersecting point X of the two diagonal lines. The weight of a load carried by the forks 4 causes the center of gravity G to move forward between the center of gravity G1 and the intersecting point X. Thus, the traction force of the rear wheels 8 increases, and the traction force of the front wheels 7 decreases. In such state, one of the front wheels 7 may be lifted from the ground. Accordingly, the controller 31 does not output the locking signal. This allows swinging of the rear axle 11. In this case, swinging of the rear axle 11 decreases the traction force of the rear wheels 8 and increases the traction force of the front wheels 7. The value of the hydraulic pressure y applied to the lifting cylinder 6, when the load on the forks 4 causes the center of gravity G to coincide with the intersecting point X, is set as the reference pressure value Nref.

The center of gravity of the forklift truck 1, when the weight of the load carried by the forks 4 becomes equal to the maximum payload of the forklift truck 1, is denoted as G2 and is located in front of the intersecting point X. When the center of gravity G of the forklift truck 1 is located between the center of gravity G2 and the intersecting point X, the traction force of the front wheels 7 increases. In such state, one of the rear wheels 8 may be lifted away from the ground. However, since the traction force of the front wheels 7, which are the drive wheels, is satisfactory, the rear axle 11 may be locked without interfering with the travel of the forklift truck 1.

However, lifting the forks 4 to a position above the reference height 2ref moves the center of gravity G upward. This causes the forklift truck 1 to become unstable laterally. At this point, the controller 31 outputs the locking signal to lock the rear axle 11 to enhance the stability of the forklift truck 1.

A second embodiment of the present invention will now be described. In this embodiment, the forklift truck 1 is not equipped with the gyroscope and the acceleration sensor. An assumed yaw rate ωx is obtained based on the steering angle θ and the traveling speed v. The objective of this embodiment is to provide a structure that is capable of obtaining the same advantages of the first embodiment while having a decreased number of parts and a more cost-efficient structure.

Figure 13:
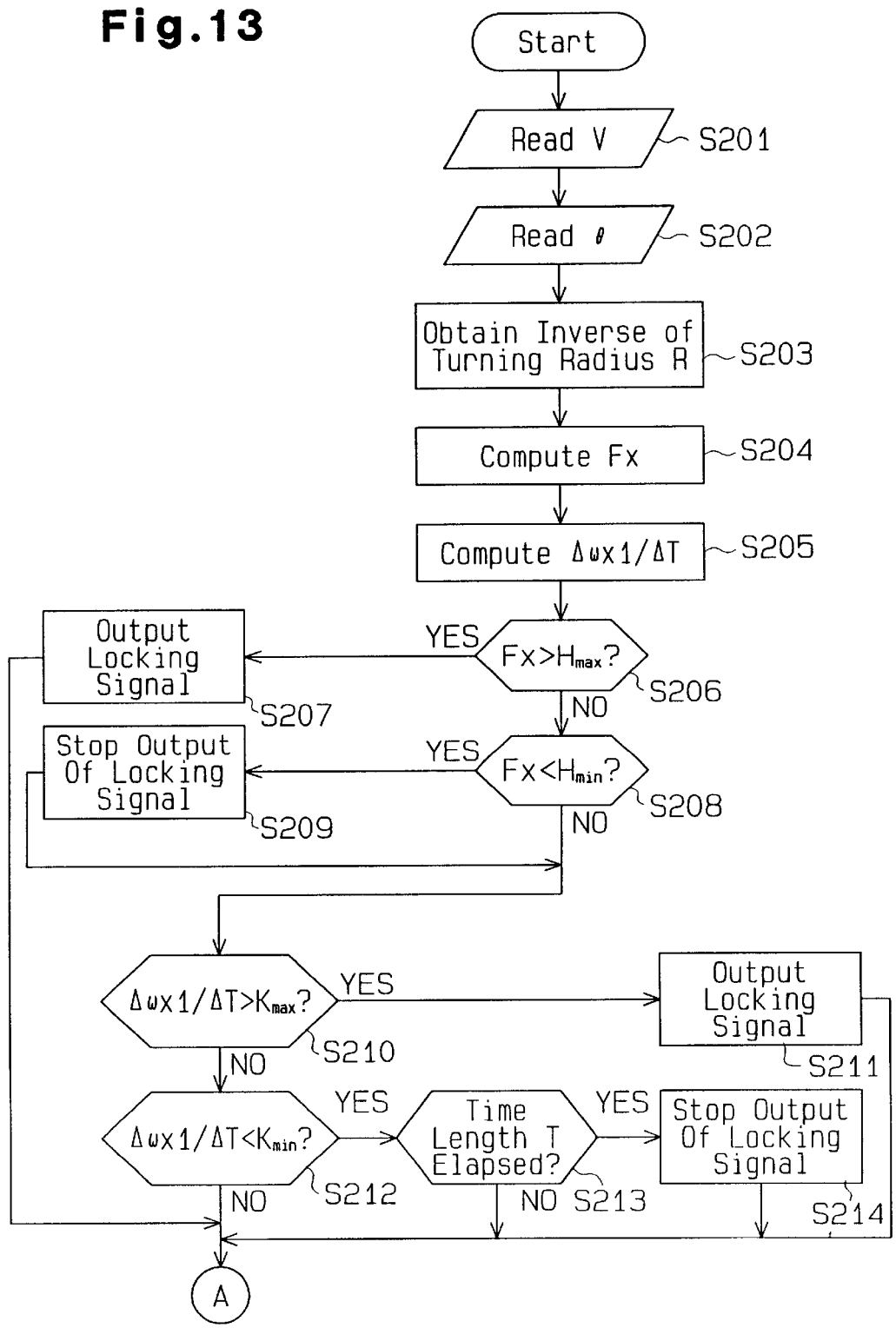
FIG. 13 is a flowchart showing the operation of the controller according to a second embodiment of the present invention.

With reference to the flowchart illustrated in FIG. 13, the controller 31 reads the traveling speed v at stop 201 and the steering angle θ at step 202. At step 203, the controller 31 obtains the inverse of a turning radius r that is computed based on the steering angle θ.

At step 204, the controller 31 computes an assumed centrifugal force Fx. The assumed centrifugal force Fx corresponds to the computed centrifugal force Fb of the first embodiment. However, since the forklift truck 1 does not have a gyroscope, the yaw rate is not detected. Instead, an assumed yaw rate value ωx is obtained by dividing the traveling speed v by the turning radius r (ωx=v/r). Thus, the assumed centrifugal force Fb is computed using the equation of Fx=2v/r, whereas, in the first embodiment, the computed centrifugal force is computed using the equation of Fb=v×ω. At step 205, the controller 31 obtains the assumed yaw rate altering rate Δωx1/ΔT. The purposes of executing these steps are the same as these in the first embodiment and will not be described for the sake of brevity.

Figure 10:
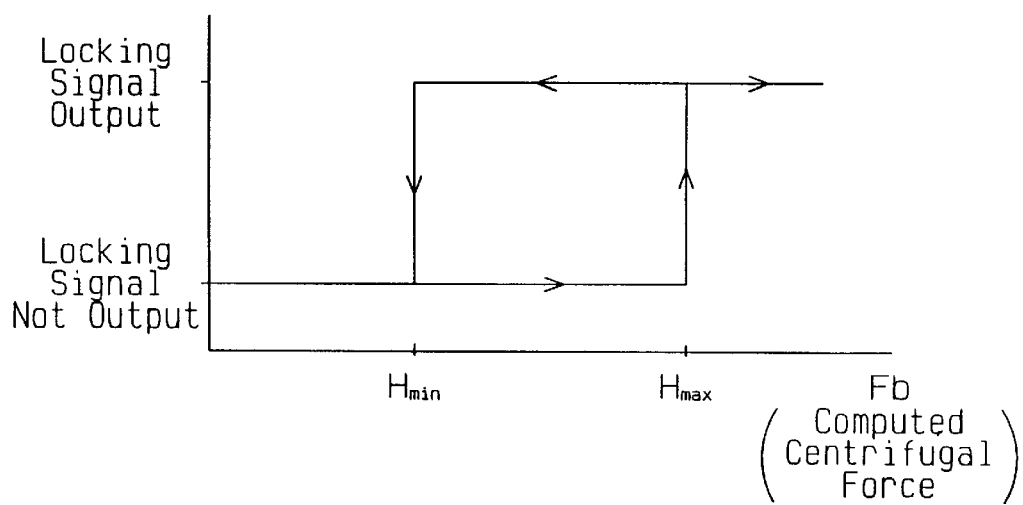
FIG. 10 is a graph showing the timing of the output of the locking signal in relation to changes in the computed centrifugal force.

The absolute value of the assumed centrifugal force Fx is compared with the maximum reference value Hmax in step 206 and with the minimum reference value Hmin in step 208. The comparison is carried out with reference to a map illustrated in FIG. 10. The altering rate Δω1/ΔT is compared with the maximum reference value Kmax in stop 210 and the minimum reference value Kmin in step 212. The purposes of executing these steps are the same as those of the first embodiment. After execution of steps 207, 211, 213, and 214, the controller 31 proceeds to step 115.

A third embodiment of the present invention will now be described with reference to FIGS. 14 to 16. In this embodiment, the rear axle 11 is gradually released from the locked state by a hydraulic unit that operates the shock absorber 12 in a gradual manner. When the rear axle 11 is locked, the interior of the shock absorber 12 is highly pressurized. If the pressure in the shock absorber 12 is suddenly decreased, the rear axle 11 may start to swing in a sudden manner. The operating mechanism of the shock absorber 12 employed in this embodiment regulates such undesirable swinging of the rear axle 11.

In this embodiment, an electromagnetic proportional valve 130 is employed in lieu of the electromagnetic switching valve 13. The controller 31 sends a duty signal to the proportional valve 130 by way of a driving circuit (not shown) to adjust the opening area of the proportional valve 130. The structure of the valve 130 will now be described.

Figure 14:
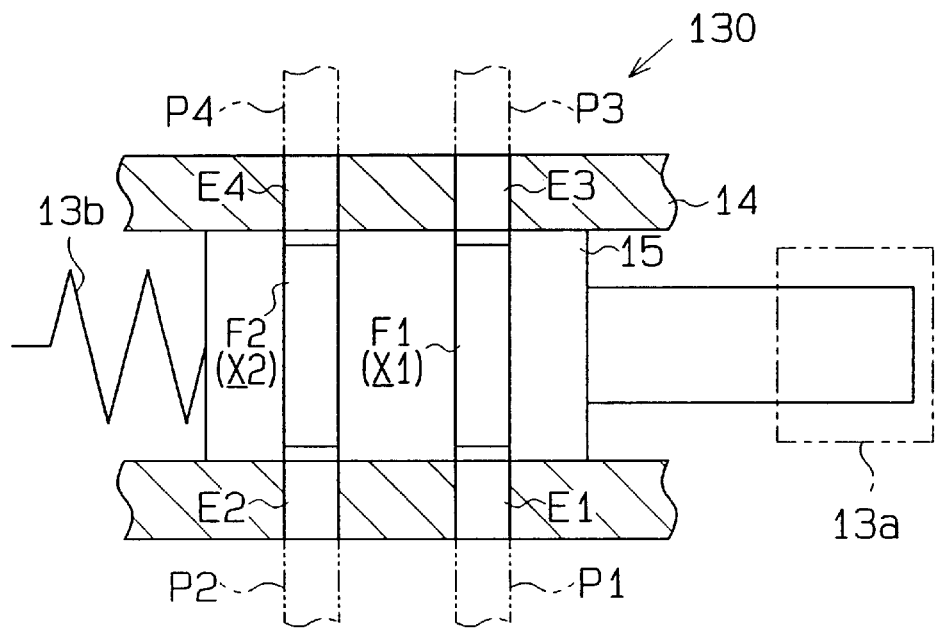
FIG. 14 is a cross-sectional drawing showing the structure of an electromagnetic switching valve according to a third embodiment of the present invention.
Figure 15:
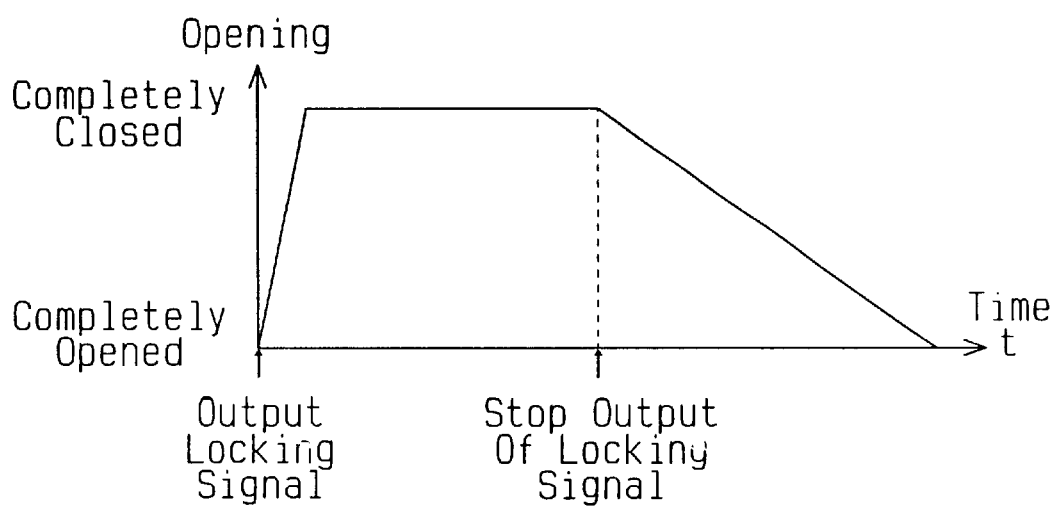
FIG. 15 is a timing chart showing changes in the opening of the electromagnetic switching valve with respect to time.

As shown in FIG. 14, the proportional valve 130 includes a cylindrical body 14 and a spool 15, which is slidably accommodated in the body 14. The spool 15 is driven by an electromagnetic solenoid 13a and a spring 13b. The spool 15 is constantly urged toward an opening position by the spring 13b. When a duty signal from the controller 31 excites the solenoid 13a, the spool 15 is moved toward a closing position. The first, second, third, and fourth oil passages P1, P2, P3, P4, are respectively connected with first, second, third, and fourth holes E1, E2, E3, E4, which extend through the wall of the body 14. The spool 15 is provided with a first groove F1 and a second groove F2. When the spool 15 is at the opening position, the first groove F1 is aligned with the first and third holes E1, E3, and the second groove F2 is aligned with the second and fourth holes E2, E4. Thus, the first groove F1 connects the first oil passage P1 to the third oil passage P3, and the second groove F2 connects the second oil passage P2 to the fourth oil passage P4.

The spool 15 is moved for a distance corresponding to the duty ratio of the duty signal sent from the controller 31. The movement of the spool 15 alters the aligned area between the first groove F1 and the corresponding holes E1, E3, and between the second groove F2 and the corresponding holes E2, E4. In other words, the movement of the spool 15 alters the opening area of the proportional valve 130. This adjusts the flow rate of the hydraulic oil flowing through the oil passages P1–P4.

Hydraulic oil is supplied to the oil passages P1–P4 from the accumulator 16. The accumulator 16 also supplies oil to the lifting cylinder 6.

The controller 31 locks the shock absorber 12 by means of the proportional valve 130 when any one of the conditions (a) to (f) for outputting the locking signal (described in the first embodiment) is satisfied. This, in turn, locks the rear axle 11. The controller 31 outputs the duty signal to the proportional valve 130 when none of the signal outputting conditions (a) to (f) is met. When first output, the duty ratio of the duty signal is one hundred percent. The duty ratio decreases gradually until it reaches zero percent. Thus, as shown in FIG. 15, the opening area of the proportional valve is gradually increased. This gradually increases the amount of hydraulic oil that flows through the shock absorber 12. Accordingly, the rear axle 11 is gradually released from the locked state. Thus, sudden swinging of the rear axle 11 is prevented.

In the same manner, the amount of hydraulic oil supplied to the lifting cylinder 6 is controlled by the proportional valve 130. Thus, when the signal outputting signal (f) is cleared, sudden lifting or lowering of the load on the forks 4 is avoided. Accordingly, the vehicle does not receive a sudden impact from the load on the forks 4. This enables smooth lifting and lowering of loads.

Figure 16:
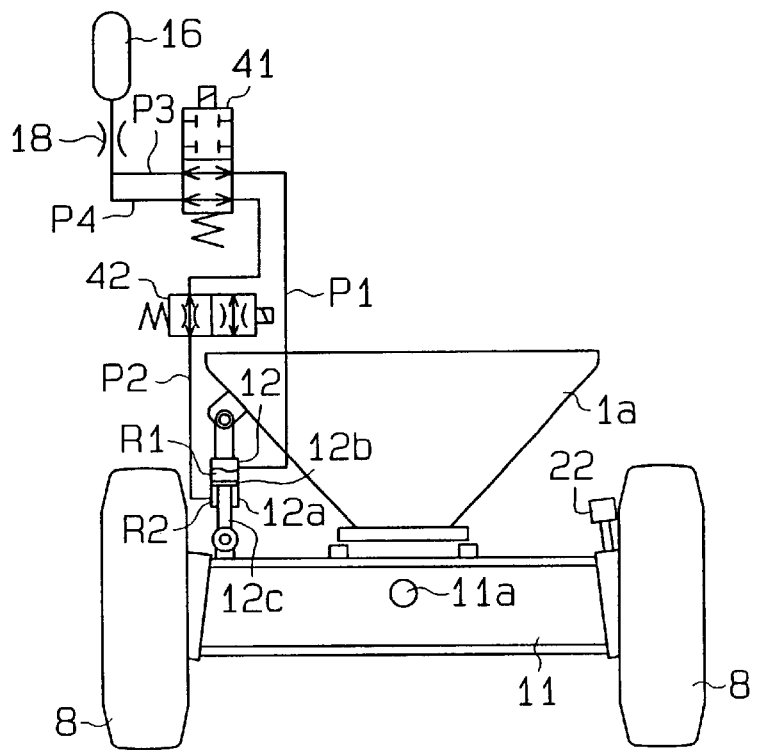
FIG. 16 is a schematic, partial rear view showing a hydraulic system that employs a switching valve provided with restricting passages that have different diameters.

FIG. 16 illustrates a further embodiment according to the present invention. This embodiment employs a first electromagnetic switching valve 41 that is similar to the one used in the first embodiment. Furthermore, a second electromagnetic switching valve 42 substitutes for the throttle valve 17. The second switching valve 42 has a minimal restricting passage 42a and a maximal restricting passage 42b, each of which restrict the flow of hydraulic oil. Hydraulic oil selectively flows through either the minimal restricting passage 42a or the maximal restricting passage 42b. The passage diameter of the minimal restricting passage 42a is greater than the passage diameter of the maximal restricting passage 42b. Thus, the amount of hydraulic oil that passes through the minimal restricting passage 42a is greater than that of the maximal restricting chamber 42b. The controller 31 is connected to the second switching valve 42. The restricting area of the switching valve 42 is adjusted to gradually release the locked state of the rear axle 11.

Figure 17:
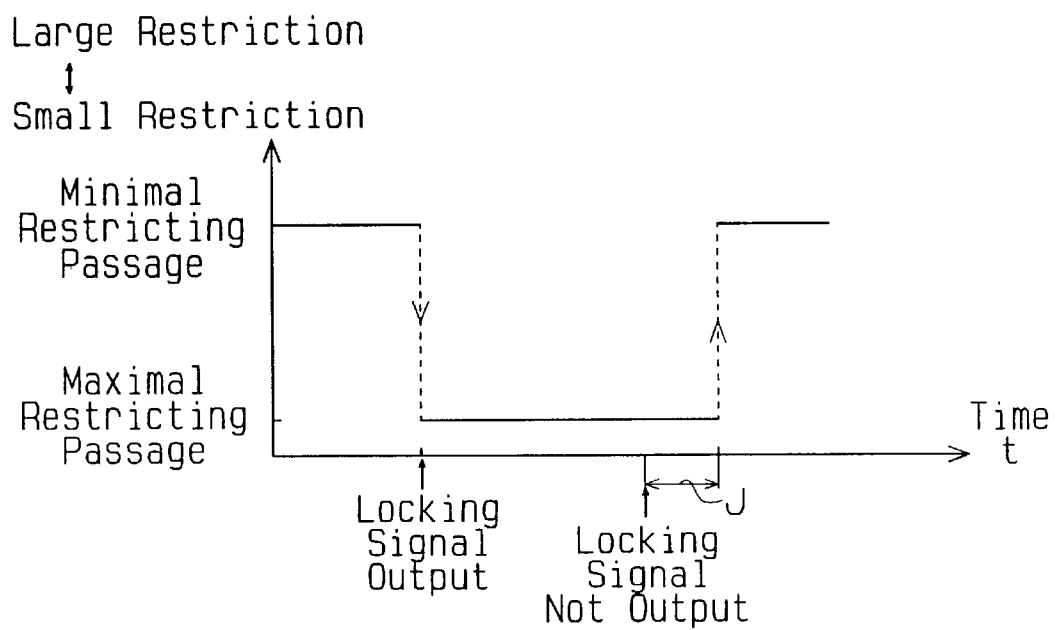
FIG. 17 is a timing chart showing the operation of the switching valve shown in FIG. 16.

As shown in FIG. 17, when the locking signal is not output from the controller 31, the minimal restricting passage 42a is selected to allow hydraulic oil flow therethrough. In this state, the shock absorber 12 supports the rear axle 11 in an unlocked state. When the controller 31 outputs the locking signal, the maximal restricting passage 42b is selected to allow hydraulic oil flow therethrough. When a predetermined time length J elapses after the controller 31 terminates the output of the locking signal, the minimal restricting passage 42a is selected to allow hydraulic oil flow therethrough. This results in the shock absorber 12 releasing the locking of the rear axle 11.

When releasing the rear axle 11 from a locked state, the flow rate of the hydraulic oil supplied to the shock absorber 12 is restricted by the minimal restricting passage 42a. This prevents sudden swinging of the rear axle 11 that may be caused by a sudden increase in the pressure within the shock absorber 12 and ensures stability of the traveling forklift truck 1.

In this embodiment, an electromagnetic proportional valve may substitute for the electromagnetic switching valve 42. Such a structure further prevents sudden swinging of the rear axle 11 when the controller 31 stops the output of the locking signal to have the shock absorber 12 release the rear axle from a locked state.

Figure 18:
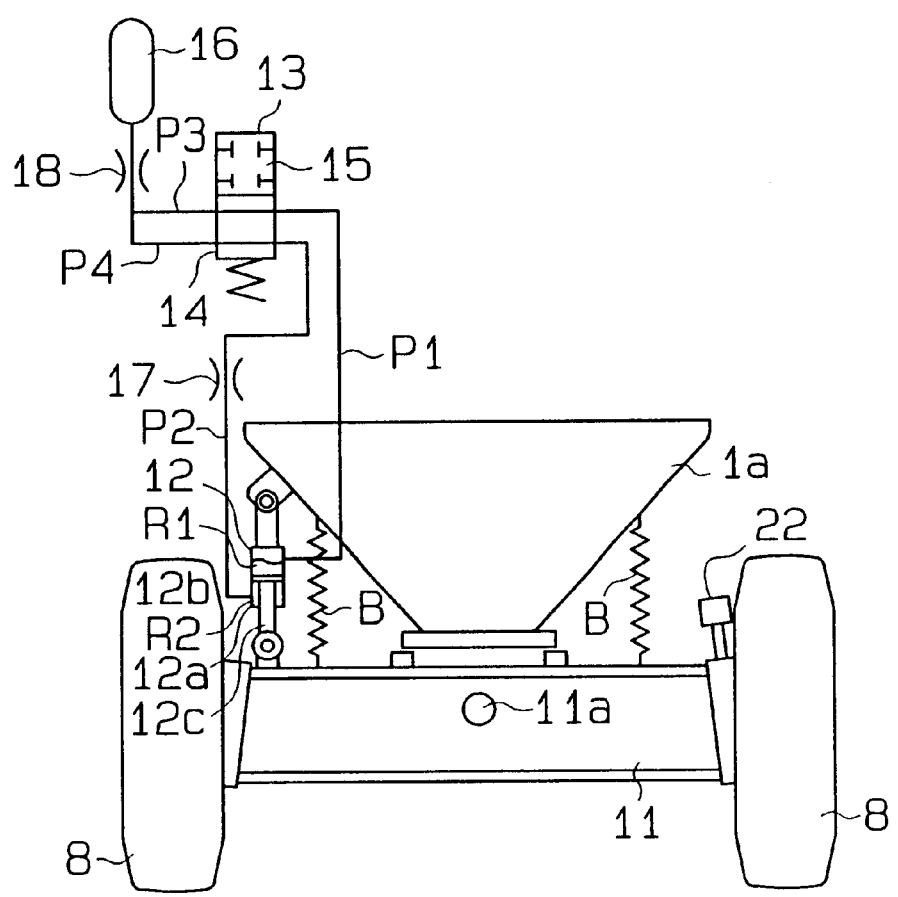
FIG. 18 is a schematic, partial rear view showing the forklift truck according to a further embodiment of the present invention.

A further embodiment of the present invention will now be described with reference to FIGS. 18 to 20. In this embodiment, a pair of coil springs B connect the rear axle 11 to the body frame is to absorb the impact transmitted to the frame 1 from the rear axle 11 when the axle 11 swings as the forklift truck 1 changes directions. In addition, the rear axle 11 is released from a locked state when the centrifugal force Fa detected by the acceleration sensor 21 becomes smaller a predetermined value. This structure is described in Japanese Unexamined Patent Publication No. 58-211903. However, since the springs B absorb the impact that is transmitted to the entire vehicle as the vehicle is being steered to change directions, the centrifugal force applied to the vehicle may not be accurately detected. As a result, the locking of the rear axle 11 may be released even when the forklift truck 1 is changing directions. This embodiment solves this problem.

Figure 19:
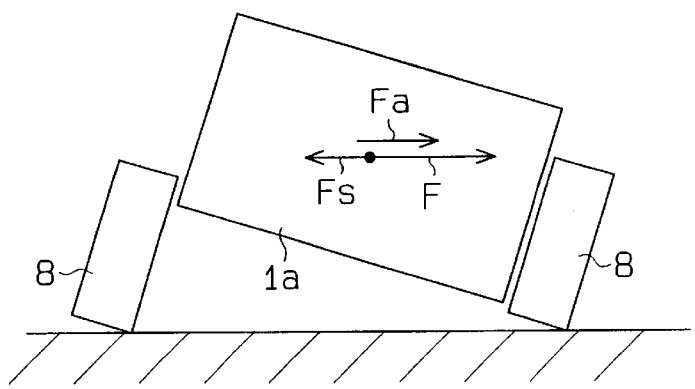
FIG. 19 is a diagrammatic explanatory view showing the centrifugal force when the forklift truck of FIG. 18 changes directions.

As shown in FIG. 19, when the forklift truck 1 changes directions, an actual centrifugal force F swings the vehicle together with the rear axle 11. During the swinging, the force Fs of the spring B acts on the rear axle 11. The centrifugal force Fa detected by the acceleration sensor 21 corresponds to the resultant force of the actual centrifugal force F and the spring force Fs.

The controller 31 compares the centrifugal force Fa with a predetermined maximum reference value Hmax and a predetermined minimum reference valve Hmin. This comparison is carried out in the same manner as illustrated in the flowchart of FIGS. 8(A), and 8(B). In this processing, the computed centrifugal force Fb replaces the centrifugal force Fa. The controller 31 stops the output of the locking signal when the predetermined time length Ta elapses after the centrifugal force Fa decreases from a value equal to or greater than the minimum reference value Hmin to a value smaller than the minimum reference value Hmin.

Figure 20:
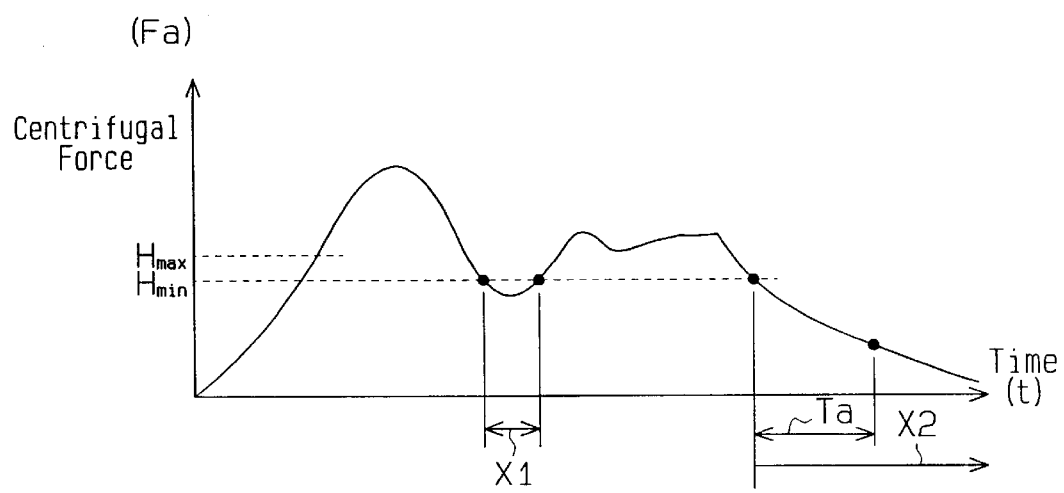
FIG. 20 is a timing chart showing changes with respect to time of the centrifugal force illustrated in FIG. 19.

FIG. 20 shows how the centrifugal force Fa detected by the acceleration sensor 21 changes as time elapses when the rear axle 11 is in a locked state during turning of the forklift truck 1. During the time period X1, the value of the centrifugal force Fa is smaller than the minimum reference value Hmin due to the spring force Fs. Since the time period X1 is shorter than the predetermined time length Ta, the controller 31 continues to output a locking signal to the electromagnetic switching valve. After the vehicle stops turning, the centrifugal force Fa remains smaller than the minimum reference value Hmin during time period X2, which is longer than the predetermined time length Ta. Thus, the controller 31 stops the output of the locking signal when the predetermined time length Ta elapses. Accordingly, the rear axle 11 remains locked regardless of the centrifugal force Fa temporarily becoming smaller than the minimum reference value. This ensures stability of the forklift truck 1 when changing directions.

Although several embodiments of the present invention have been described herein, it should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. The control apparatus for an industrial vehicle including a rear axle, said rear axle being swingable during straight travel of the vehicle and being lockable during turning of the vehicle, said apparatus comprising:

holding means for selectively locking and unlocking the rear axle;

memory means for storing a first value and a second value of an angular velocity rate, wherein said angular velocity rate represents an angular velocity per unit time, wherein said first value is predetermined to indicate turning of the vehicle when the angular velocity rate is greater than the first value, and wherein said second value is predetermined to indicate the straight travel of the vehicle when the angular velocity rate is smaller than the second value; and control means for selectively activating and deactivating the holding means, said control means activating the holding means to lock the rear axle when the angular velocity rate is greater than the first value, said control means deactivating the holding means to unlock the rear axle when the angular velocity is kept smaller than the second value for a predetermined time period after the angular velocity rate has become smaller than the second value.

2. The control apparatus as set forth in claim 1, wherein said holding means includes a hydraulic damper coupled to the rear axle to selectively lock and unlock the rear axle.

3. The control apparatus as set forth in claim 2, wherein said control means includes:
   valve means arranged to be selectively open and closed to control a supply of pressurized fluid to the damper; and
   a controller for actuating the valve means based on a comparison of the angular velocity rate and the first and the second values.

4. The control apparatus as set forth in claim 3, wherein said controller outputs a signal to the valve means to activate the damper when the angular velocity rate is greater than the first value and stops outputting the signal when the angular velocity rate is smaller than the first value and subsequently smaller than the second value.

5. The control apparatus as set forth in claim 4, wherein said controller includes a counter for counting for a predetermined time period after the angular velocity rate has become smaller than the second value and stops outputting the signal after the counter has finished counting.

6. The control apparatus as set forth in claim 3, wherein said control means includes a memory forming said memory means.

7. The control apparatus as set forth in claim 1, further comprising:
   first detecting means for detecting an angular velocity of the vehicle; and
   first computing means for computing the angular velocity rate, said first computing means differentiating the angular velocity detected by the first detecting means to obtain the angular velocity rate.

8. The control apparatus as set forth in claim 1, further comprising:
   second detecting means for detecting a steering angle;
   third detecting means for detecting a vehicle velocity; and
   second computing means for computing an angular velocity based on the detected steering angle and the detected vehicle velocity, said second coupling means computing the angular velocity rate by differentiating the angular velocity.

9. The control apparatus as set forth in claim 5, wherein said valve means includes an electromagnetic valve that is open based on the signal from the controller, and which further comprises:
   a fluid source for supplying the pressurized fluid to the damper through the electromagnetic valve when the valve is open.

10. The control apparatus as set forth in claim 9 wherein said controller controls the electromagnetic control valve, wherein the controller outputs a duty signal to actuate the electromagnetic control valve, wherein the duty signal is varied gradually to gradually unlock the rear axle; and
   said electromagnetic valve increasingly opening in accordance with the signal from the controller.

11. The control apparatus as set forth in claim 7 further comprising:
   fourth detecting means for detecting a vehicle velocity;
   second computing means for computing a centrifugal force acting on the vehicle based on the angular velocity detected by the first detecting means and the vehicle velocity detected by the forth detecting means;
   said memory means storing a maximum reference value and a minimum reference value with respect to the centrifugal force computed by the second comprising means; and
   said control means activating the valve means to lock the damper when the centrifugal force is in excess of the maximum reference value to lock the rear axle when the angular velocity rate is greater than the first value, said control means deactivating the valve means when the angular velocity rate is smaller than the second value.

12. The control apparatus as set forth in claim 7, wherein said vehicle is arranged to carry a load; and which further comprises:
   fifth detecting means for detecting the weight of a load that is in excess of a predetermined value and outputting a signal; and
   sixth detecting means for detecting a position of the load that is higher than a predetermined vertical position and outputting a signal;
   said control means actuating the valve means based upon signals from the fifth detecting means and the sixth detecting means.

13. The control apparatus as set forth in claim 7, wherein said first detecting means includes a gyroscope.

14. The control apparatus for an industrial vehicle including a rear axle, said rear axle being pivotable during straight travel of the vehicle and lockable during turning of the vehicle, said vehicle being capable of carrying a load, said apparatus comprising:
   holding means for selectively locking and unlocking the rear axle, said holding means including a hydraulic damper coupled to the rear axle to selectively lock and unlock the rear axle;
   first detecting means for sensing a pressure which is representative of the weight of a load that is in excess of a predetermined value and outputting a signal;
   second detecting means for sensing a position of the load that is higher than a predetermined vertical position and outputting a signal; and
   control means for actuating the holding means based on the signals from the first detecting means and the second detecting means, wherein said control means includes:
   valve means arranged to be selectively opened and closed to control a supply of pressurized fluid to the damper; and
   a valve controller for actuating the valve means based on detections of the pressure sensor and the position sensor;
   wherein said valve controller outputs a signal to the valve means to activate the damper when the sensed pressure is greater than a predetermined value and the sensed position of the load is higher than a predetermined vertical position and stops outputting the signal when the sensed pressure is smaller than the predetermined value and the sensed position of the load is lower than the predetermined vertical position.

15. The control apparatus as set forth in claim 14, wherein said vehicle includes fork lift apparatus comprising:
   a mast vertically extending in a front portion of the vehicle;
   a fork for carrying the load, said fork being vertically movable along the mast;
   a hydraulic cylinder for vertically shifting the fork;
   said first detecting means further including a pressure sensor for detecting the pressure of said hydraulic fluid; and
   said second detecting means further including a position sensor for detecting a position of the fork along the mast.

16. The control apparatus as set forth in claim 14 wherein:
said valve means includes an electromagnetic valve that is open based on the signal from the controller; and which further comprises
a final source for supplying the pressurized fluid to the damper through the electromagnetic valve when the valve is open.

17. The control apparatus for an industrial vehicle including a rear axle, said rear axle being pivotable during straight travel of the vehicle and lockable during turning of the vehicle, said apparatus comprising:
holding means for selectively locking and unlocking the rear axle, said holding means including a hydraulic damper coupled to the rear axle to selectively lock and unlock the rear axle;
a fluid source for supplying pressurized fluid to the holding means;
memory means for storing a first condition and a second condition of the driving state of the vehicle, wherein the holding means locks the rear axle to stabilize the vehicle when the first condition is met, and wherein the holding means unlocks the rear axle to improve the driving performance of the vehicle when the second condition is met;
detecting means for detecting whether the second condition has been met when the holding means is locking the rear axle;
control means for actuating the holding means to unlock the rear axle based on the detection of the detecting means;
buffer means for slowing the unlocking action of the holding means according to an instruction of the control means, said buffer means including an electromagnetic control valve located between the fluid source and the damper, wherein said valve unlocks the damper by allowing the fluid to flow in a passage when the valve is open, and wherein said valve locks the damper by closing the passage when the valve is closed; and
a valve controller for controlling the electromagnetic control valve, wherein the valve controller outputs a duty signal to actuate the electromagnetic control valve, and wherein the duty signal is varied gradually to gradually unlock the rear axle when the detecting means detects the second condition.

18. A control apparatus for an industrial vehicle including a rear axle, the rear axle being pivotable during straight travel of the vehicle and lockable when the vehicle is turned, the apparatus comprising:
holding means for selectively locking and unlocking the rear axle, the holding means including a hydraulic damper coupled to the rear axle to selectively lock and unlock the rear axle;
a fluid source for supplying a pressurized fluid to the holding means;
memory means for storing a first condition and a second condition of the driving state of the vehicle, wherein the holding means locks the rear axle to stabilize the vehicle when the first condition of the vehicle is met, and wherein the holding means unlocks the rear axle to improve the driving performance of the vehicle when the second condition is met;
detecting means for detecting whether the second condition has been met when the holding means is locking the rear axle;
control means for actuating the holding means to unlock the rear axle based on the detection of the detecting means;
buffer means for slowing the unlocking action of the holding means, according to an instruction of the control means, said buffer means including an electromagnetic switching valve disposed between the fluid source and the damper, the switching valve having a smaller opening and a larger opening, said openings being used selectively to adjust the pressure in the damper; and
a controller for actuating the switching valve to select the smaller opening when the detecting means detects that the second condition is met.

19. A control apparatus for an industrial vehicle including a rear axle, the rear axle being pivotable during straight travel of the vehicle and lockable during turning of the vehicle, said apparatus comprising:
an elastic member for supporting the rear axle to absorb any inclining movement thereof when the vehicle turns;
holding means for selectively locking and unlocking the rear axle;
memory means for storing a predetermined maximum value and a predetermined minimum value of the acceleration; and
control means for actuating the holding means to selectively lock and unlock the rear axle, said rear axle being locked when the acceleration is greater than the maximum value and unlocked when the acceleration is kept smaller than the minimum value for a predetermined time period after the acceleration has become smaller than the minimum value.

20. The control apparatus as set forth in claim 19, wherein said holding means includes a hydraulic damper coupled to the rear axle to selectively lock and unlock the rear axle.

21. The control apparatus as set forth in claim 20, wherein said control means includes:
valve means selectively opened and closed to control a supply of pressurized oil to the damper; and
a controller for actuating the valve means based on a comparison of the detected acceleration and the maximum and the minimum values.

22. The control apparatus as set forth in claim 21, wherein said controller outputs a signal to the valve means to activate the damper when the acceleration is greater than the maximum value and stops outputting the signal when the acceleration is smaller than the maximum value and subsequently smaller than the minimum value.

23. The control apparatus as set forth in claim 22, wherein said controller includes a counter for counting for the predetermined time period after the acceleration has become smaller than the minimum value and said controller stops outputting the signal after the counter has finished counting.

24. The control apparatus as set forth in claim 23, wherein said elastic member includes a pressurized coil spring.

25. An industrial vehicle comprising:
a body;
a pivotable rear axle;
a hydraulic damper located between the rear axle and the body, wherein one end of the damper is connected to the rear axle and an opposite end of the damper is connected to the body;
a valve that permits hydraulic fluid to flow in a passage connected to the damper, wherein the valve selectively locks and unlocks the damper, wherein the rear axle is prevented from pivoting with respect to the body when the damper is locked;
a memory that stores a first value, which represents a first angular velocity rate, and a second value, which represents a second angular velocity rate, wherein the vehicle is determined to be turning when its angular velocity rate is greater than the first value, and the vehicle is determined to be traveling straight ahead when its angular velocity rate is less than the second value;

a controller that locks and unlocks the damper according to operating conditions of the vehicle, wherein the controller locks the damper when the angular velocity rate of the vehicle is greater than the first value, and the controller unlocks the damper when the angular velocity rate of the vehicle has been less than the second value for a predetermined time period after the angular velocity rate of the vehicle has fallen below the second value.

26. An industrial vehicle comprising:

a body;

a pivotable rear axle;

a hydraulic damper located between the rear axle and the body, wherein one end of the damper is connected to the rear axle and an opposite end of the damper is connected to the body;

a valve that permits hydraulic fluid to flow in a passage connected to the damper, wherein the valve selectively locks and unlocks the damper, wherein the rear axle is prevented from pivoting with respect to the body when the damper is locked;

a weight sensor that detects a value representing the weight of a load on the vehicle;

a position sensor that detects whether the load is located higher than a predetermined vertical position;

a controller that locks and unlocks the damper based on signals from the sensors, wherein the controller sends a signal to the valve to lock the damper when the value representing the weight of the load is less than the predetermined weight value and the load is located below the predetermined vertical position.

27. An industrial vehicle comprising:

a body;

a pivotable rear axle;

a hydraulic damper located between the rear axle and the body, wherein one end of the damper is connected to the rear axle and an opposite end of the damper is connected to the body;

a valve that permits hydraulic fluid to flow in a passage connected to the damper, wherein the valve selectively locks and unlocks the damper, and the rear axle is prevented from pivoting with respect to the body when the damper is locked, wherein the valve has an opening area which may be gradually increased to gradually permit an increasing amount of hydraulic fluid to flow through the valve, into the passage, as the vale is opened; and a controller that locks the damper when a locking condition is met and unlocks the damper when an unlocking condition is met, wherein the controller gradually increases the opening area of the valve to gradually unlock the damper when the unlocking condition is met.

28. The industrial vehicle as set forth in claim 27, wherein the valve is an electromagnetic proportional valve.

29. The industrial vehicle as set forth in claim 28, wherein the valve is an electromagnetic proportional valve comprises a body and a spool movably received within the body, the body defining at least two openings and the spool defining a passage therethrough, wherein the degree of alignment of the passage with the openings define the opening area of the valve.

* * * * *

UNITED STATES PATENT AND TRADEMARK OFFICE
CERTIFICATE OF CORRECTION

PATENT NO.    : 6,240,353 B1
DATED         : May 29, 2001
INVENTOR(S)   : Ishikawa et al.

It is certified that error appears in the above-identified patent and that said Letters Patent is hereby corrected as shown below:

Title page,
FOREIGN PATENT DOCUMENTS, please change "B66F/9/24" to -- B60G 9/02 -- and please change "B06G/" to -- B6G/ --

Column 1,
Line 26, please change "having a slow" to -- having to slow --
Line 35, please change "described" to -- describes --

Column 2,
Line 6, please change "stronger is" to -- stronger if --
Line 53, please change "wheels the" to -- wheels, the --

Column 4,
Line 11, please change "a first" to -- A first --
Line 31, please delete "a"
Line 60, please change "to the detect the" to -- to detect the --

Column 5,
Line 63, please change "valve" to -- value --

Column 6,
Lines 3, 4, 50, 57, 59 and 64, please change "valve" to -- value --
Line 5, please change "measure dtime" to -- measured time --
Line 6, please change "time" to -- timer --
Line 18, please change "valve Hmax to a valve" to -- value Hmax to a value --
Line 42, please change "sends alocking" to -- sends a locking --
Lines 47 and 51, please change "grater" to -- greater --
Line 60, please change "grater than the maximum reference valve" to -- greater than the maximum reference value --
Line 63, please change "valve Hmax, form a valve" to -- value Hmax from a value --

Column 7,
Lines 37, 39 and 57, please change "valve" to -- value --
Line 42, please change "This empolyees the" to -- This employs the --

Column 8,
Lines 8, 46, 52, 54, 55, 56, 63, 65 and 66, please change "valve" to -- value --
Line 61, please change "valves" to -- values --

UNITED STATES PATENT AND TRADEMARK OFFICE
CERTIFICATE OF CORRECTION

PATENT NO. : 6,240,353 B1
DATED : May 29, 2001
INVENTOR(S) : Ishikawa et al.

It is certified that error appears in the above-identified patent and that said Letters Patent is hereby corrected as shown below:

Column 9,
Line 5, please change "and maintained at" to -- are maintained at --
Lines 7, 13, 22, 24, 37, 47 and 50, please change "valve" to -- value --
Line 19, please change "or tho the left" to -- or to the left --
Line 32, please change "decreases the valve" to -- decrease the value --
Lines 34 and 53, please change "valves" to -- values --

Column 10,
Line 3, please change "predetermine dtime" to -- predetermined time --
Line 10, please change "valves" to -- values --.
Line 12, please change "valve" to -- value --
Line 61, please change "and the left rear wheel 8." to -- and the right rear wheel 8 and between the right front wheel 7 and the left rear wheel --

Column 11,
Line 56, please change "these" to -- those --

Column 13,
Line 49, please change "frame is" to -- frame 19 --

Column 14,
Line 5, please change "valve" to -- value --
Line 41, please change "The control" to -- A control --

Column 15,
Line 3, please change "open and closed" to -- opened and closed --
Line 23, please delete ","
Line 42, please change "controller," to -- controller; --
Line 47, please change "claim 9" to -- claim 9, --
Line 61, please change "forth" to -- fourth --

Column 16,
Line 21, please change "The" to -- A --

UNITED STATES PATENT AND TRADEMARK OFFICE
CERTIFICATE OF CORRECTION

PATENT NO.   : 6,240,353 B1
DATED        : May 29, 2001
INVENTOR(S)  : Ishikawa et al.

It is certified that error appears in the above-identified patent and that said Letters Patent is hereby corrected as shown below:

<u>Column 18,</u>
Line 13, please change "the" to -- said --

<u>Column 19,</u>
Line 37, please add after the word load, -- is greater than a predetermined weight value and the load is located higher than the predetermined position, and the controller discontinues the signal to lock the damper when the value representing the weight of the load --

<u>Column 20,</u>
Line 30, please change "valve" to -- value --

Signed and Sealed this

Twentieth Day of August, 2002

Attest:

JAMES E. ROGAN
*Attesting Officer*   *Director of the United States Patent and Trademark Office*